(12) United States Patent
Kusaka

(10) Patent No.: US 8,243,189 B2
(45) Date of Patent: Aug. 14, 2012

(54) IMAGE SENSOR AND IMAGING APPARATUS

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 756 days.

(21) Appl. No.: 12/289,081

(22) Filed: Oct. 20, 2008

(65) Prior Publication Data

US 2009/0135289 A1    May 28, 2009

Related U.S. Application Data

(60) Provisional application No. 60/996,401, filed on Nov. 15, 2007.

(30) Foreign Application Priority Data

Oct. 23, 2007  (JP) ................................. 2007-275674

(51) Int. Cl.
*H04N 5/232*  (2006.01)
(52) U.S. Cl. ........................................ 348/350; 348/345
(58) Field of Classification Search .................. 348/345, 348/349, 350, 354; 396/89, 106–124
See application file for complete search history.

(56) References Cited

U.S. PATENT DOCUMENTS

| | | | | |
|---|---|---|---|---|
| 6,829,008 B1 | 12/2004 | Kondo et al. | ................... | 348/302 |
| 7,715,703 B2* | 5/2010 | Utagawa et al. | ............... | 396/111 |
| 2002/0036257 A1 | 3/2002 | Yamashita et al. | ......... | 250/208.1 |
| 2003/0193600 A1 | 10/2003 | Kitamura et al. | ........ | 348/333.01 |
| 2005/0094012 A1 | 5/2005 | Gomi et al. | ................... | 348/308 |
| 2007/0126909 A1 | 6/2007 | Kuruma | .................... | 348/333.01 |
| 2010/0188532 A1* | 7/2010 | Kusaka et al. | ........... | 348/240.99 |

FOREIGN PATENT DOCUMENTS

| | | |
|---|---|---|
| JP | A-2000-032318 | 1/2000 |
| JP | A-2000-156823 | 6/2000 |
| JP | A-2002-76317 | 3/2002 |
| JP | A-2003-333410 | 11/2003 |
| JP | A-2003-348437 | 12/2003 |
| JP | A-2004-088703 | 3/2004 |
| JP | A-2005-86246 | 3/2005 |
| JP | A-2005-208392 | 8/2005 |
| JP | A-2005-277513 | 10/2005 |
| JP | A-2006-267599 | 10/2006 |
| JP | A-2006-279652 | 10/2006 |
| JP | A-2007-110639 | 4/2007 |
| JP | A-2007-150643 | 6/2007 |

OTHER PUBLICATIONS

Mar. 6, 2012 Office Action issued in Japanese Patent Application No. 2007-275674 (with translation).

* cited by examiner

*Primary Examiner* — Mohammed Hasan
(74) *Attorney, Agent, or Firm* — Oliff & Berridge, PLC

(57) ABSTRACT

An image sensor includes: a plurality of imaging pixels disposed two-dimensionally in rows and columns to capture an image; a plurality of first focus detection pixels for focus detection and a plurality of second focus detection pixels for focus detection being disposed in a row in place of the imaging pixels; a row selection circuit that selects in turn a row; a column selection circuit that selects in turn a column; and an output circuit that outputs pixel signals from the pixels selected by the column selection circuit, out of the pixels in the rows selected by the row selection circuit, wherein the column selection circuit selects a column according to whether or not the row selected by the row selection circuit includes the first and the second focus detection pixels.

12 Claims, 24 Drawing Sheets

13  10

313

10  14

314

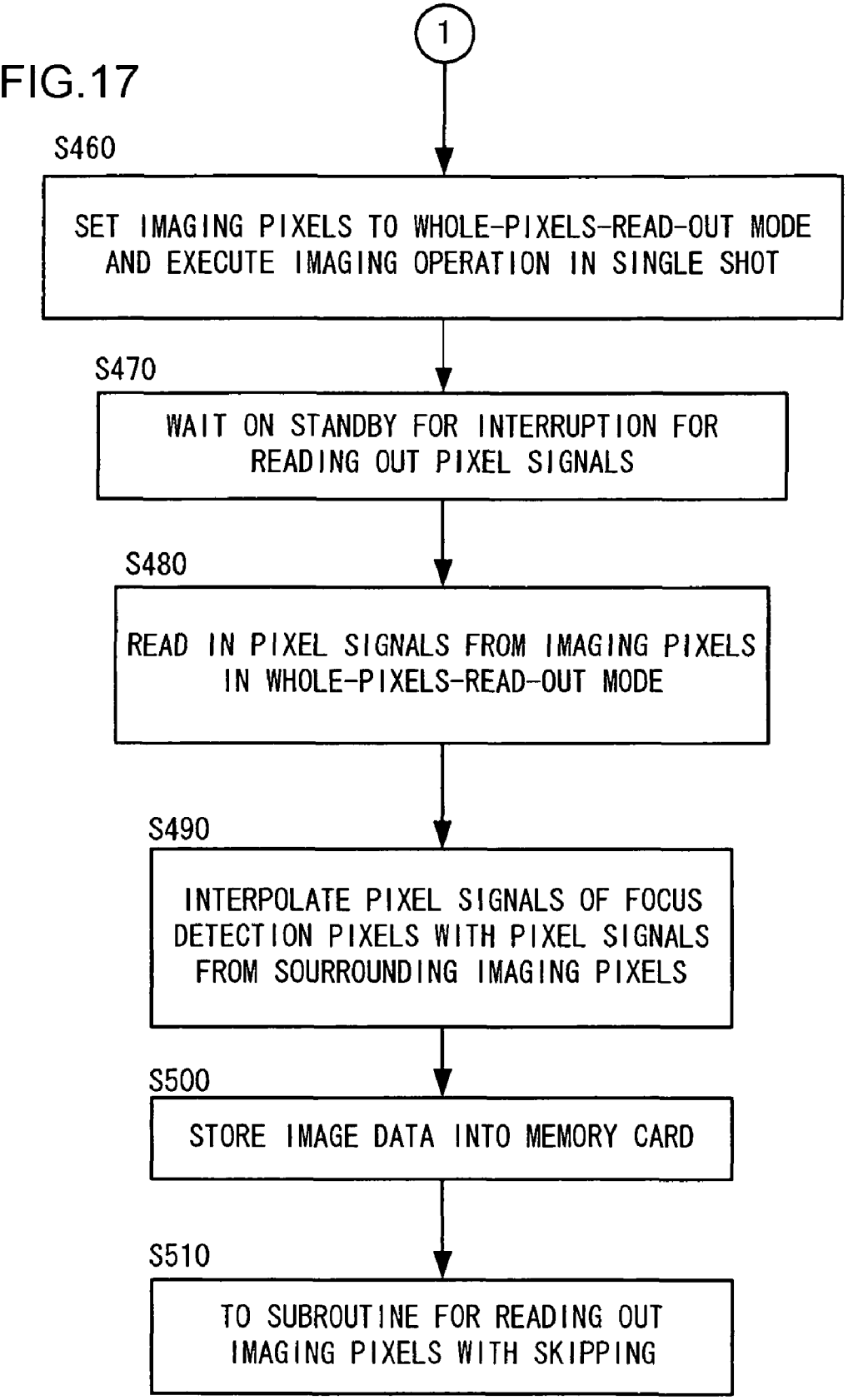

IMAGE SENSOR AND IMAGING APPARATUS

INCORPORATION BY REFERENCE

This non-provisional application claims the benefit of U.S. Provisional Application No. 60/996,401 filed Dec. 15, 2007. This application also claims priority from Japanese Application No. 2007-275674 filed Oct. 23, 2007. The disclosure of each of the earlier applications is incorporated herein by reference in its entirety.

BACKGROUND OF THE INVENTION

1. Field of the Invention

The present invention relates to an image sensor and an imaging apparatus.

2. Description of Related Art

Japanese Laid-Open Patent Application No. 2000-156823 discloses an imaging apparatus that executes imaging and focus detection with an image sensor that includes two-dimensionally disposed imaging pixels, a portion of which has been replaced by focus detection pixels.

The conventional imaging apparatus operates in three modes: a still-image imaging mode in which signal are read out from all the lines on the image sensor in order to obtain a high-resolution still image; a skip mode in which some lines are skipped upon reading out signals from the lines on the image sensor for EVF (Electronic View Finder) display (i.e., live view display via a through image); and a range measurement mode in which signals from the lines including focus detection pixels are read out for detecting the focus of the imaging optical system. When a still image is to be taken, the imaging apparatus first executes EVF display in the skip mode to determine a picture composition, then changes the operation mode to the range measurement mode to execute AF (Auto Focusing) of the imaging optical system, and finally changes the operation mode to the still-image imaging mode to execute image capturing.

SUMMARY OF THE INVENTION

However, the conventional imaging apparatus executes the live view display and the AF operation alternately by switching the operation modes between the skip mode and the live view mode, so that the period of time for updating images in the live view display is prolonged. As a result, there arise problems that display performance for displaying a subject, in particular a moving photographic subject is decreased and that AF intervals become longer to decrease the AF response.

An image sensor according to a first aspect of the present invention includes: a plurality of imaging pixels disposed two-dimensionally in rows and columns for receiving light from a subject via an optical system to capture an image; a plurality of first focus detection pixels each receiving one of a pair of light fluxes for focus detection via the optical system and a plurality of second focus detection pixels each receiving the other of the pair of light fluxes for focus detection via the optical system, the plurality of first focus detection pixels and the plurality of second focus detection pixels being disposed, in place of the imaging pixels, in a portion of a row in which the imaging pixels are to be disposed; a row selection circuit that selects in turn a row from which pixel signals are read out among the plurality of imaging pixels and the plurality of first and second focus detection pixels being two-dimensionally disposed; a column selection circuit that selects in turn a column from which pixel signals are read out among the plurality of imaging pixels and the plurality of first and second focus detection pixels being two-dimensionally disposed; and an output circuit that outputs pixel signals from the pixels selected by the column selection circuit, out of the pixels disposed in the rows selected by the row selection circuit, wherein the column selection circuit selects a column according to whether or not the row selected by the row selection circuit includes the first focus detection pixels and the second focus detection pixels.

According to a second aspect of the present invention, it is preferred that the image sensor according to the first aspect further includes: a skip-read-out mode in which pixel signals are read out from the pixels with skipping and a whole-pixels-read-out mode in which pixel signals are read out from all the pixels, wherein the column selection circuit selects a column from which pixel signals are to be read out in the rows selected by the row selection circuit at a predetermined interval when the pixel-skip read-out mode is set, and the predetermined interval for the row includes the first and the second focus detection pixels is set shorter than the predetermined pixel interval for the row that does not include the first and the second focus detection pixels.

According to a third aspect of the present invention, it is preferred that the image sensor according to the first aspect further includes: a skip-read-out mode in which pixel signals are read out from the pixels with skipping and a whole-pixels-read-out mode in which pixel signals are read out from all the pixels, wherein when the pixel-skip read-out mode is set, and if the row selected by the row selection circuit does not include the first and the second focus detection pixels, the column selection circuit selects a column from which pixel signals are to be read out at a predetermined interval such that the imaging pixels disposed in the row are evenly selected, or if the row selected by the row selection circuit includes the first and the second focus detection pixels, the column selection circuit selects only the first and the second focus detection pixels or a portion of pixels included in the first and the second focus detection pixels.

According to a forth aspect of the present invention, it is preferred that the image sensor according to the first aspect further includes: a skip-read-out mode in which pixel signals are read out from the pixels with skipping and a whole-pixels-read-out mode in which pixel signals are read out from all the pixels, wherein when the skip-read-out mode is set, the column selection circuit restricts a total number of pixels from which pixel signals are to be read out in the row in which the first and the second focus detection pixels are included so as to be equal to or less than a total number of pixels from which pixel signals are to be read out in the row in which the first and the second focus detection pixels are not included.

According to a fifth aspect of the present invention, it is preferred that the image sensor according to the first aspect further includes: a skip-read-out mode in which pixel signals are readout from the pixels with skipping and a whole-pixels-read-out mode in which pixel signals are read out from all the pixels, wherein when the whole-pixels-read-out mode is set, the column selection circuits selects a column such that pixel signals are read out from all the pixels in the row selected by the row selection circuit.

According to a sixth aspect of the present invention, it is preferred that the image sensor according to the first aspect further includes: a skip-read-out mode in which pixel signals are read out from the pixels with skipping and a whole-pixels-read-out mode in which pixel signals are read out from all the pixels, wherein when the skip-read-out mode is set, the row selection circuits selects a row from which pixel signals are to be read out at a predetermined interval and selects a row in which the first and the second focus detection pixels are included as the rows from which pixel signals are to be read out.

According to a seventh aspect of the present invention, it is preferred that in the image sensor according to the first aspect, the first focus detection pixels each are constituted with a micro-lens and a first photoelectric converting unit disposed on a rear side of the micro-lens and the second focus detection pixels each are constituted with a micro-lens and a second photoelectric converting unit disposed on a rear side of the micro-lens that constitutes the second photoelectric conversion unit, with the second photoelectric converting unit being paired with the first photoelectric converting unit.

According to a eighth aspect of the present invention, it is preferred that in the image sensor according to the first aspect, the imaging pixels each are constituted with a plurality of imaging pixels having spectral sensitivity characteristics different from each other.

An imaging apparatus according to a ninth aspect of the present invention includes: an image sensor according to the first aspect; a control unit that controls storage of electric charges in the image sensor and read-out of pixel signals from the image sensor; an image display device that displays an image based on pixel signals output from the imaging pixels in the image sensor; and a focus detector that detects a focus adjustment state of the optical system based on pixel signals output from the first and the second focus detection pixels in the image sensor.

According to a tenth aspect of the present invention, it is preferred that the imaging apparatus according to the ninth aspect further includes: a pixel-skip read-out mode in which pixel signals are read out from the pixels with skipping and a whole-pixels-read-out mode in which pixel signals are read out from all the pixels, wherein when the skip-read-out is set, the control unit two-dimensionally scans the imaging pixels, the first focus detection pixels, and the second focus detection pixels on the image sensor, periodically performs storage of electric charge and read-out of pixel signals, updates the image displayed by the image display device, and updates a result of the focus detection by the focus detector.

According to a eleventh aspect of the present invention, it is preferred that the imaging apparatus according to the ninth aspect further includes: a skip-read-out mode in which pixel signals are read out from the pixels with skipping and a whole-pixels-read-out mode in which pixel signals are read out from all the pixels, wherein when the whole-pixels-read-out mode is set, the control unit controls the row selection circuit and the column selection circuit to read out pixel signals from all the pixels on the image sensor.

According to a twelfth aspect of the present invention, it is preferred that the imaging apparatus according to the ninth aspect further includes: a focus adjustment unit that performs focus adjustment of the optical system based on the focus adjustment state detected by the focus detector.

According to a thirteenth aspect of the present invention, it is preferred that the imaging apparatus according to the ninth aspect further includes: an interpolation unit that generates pixel signals at points of the first focus detection pixels and the second focus detection pixels, respectively, based on pixel signals of the plurality of imaging pixels disposed around the first focus detection pixels and the second focus detection pixels, wherein the image display device displays an image based on the pixel signals output from the imaging pixels and the pixel signals generated by the interpolation unit.

An image sensor according to a fourteenth aspect of the present invention includes: a plurality of imaging pixels two-dimensionally disposed, each receiving a light flux via an optical system and outputting a light reception signal; a plurality of focus detection pixels disposed in the disposition of the imaging pixels along a predetermined direction of the disposition of the imaging pixels, each receiving a light flux via the optical system and outputting a light reception signal; a selection unit that selects a pixel disposition disposed along the predetermined direction out of two-dimensional pixel dispositions each constituted with the plurality of imaging pixels and the plurality of focus detection pixels; and an output control unit that selectively outputs the light reception signal by a different method for read-out depending on whether or not the pixel disposition selected by the selection unit includes the focus detection pixels.

BRIEF DESCRIPTION OF THE DRAWINGS

FIG. 17 is a flowchart illustrating a shutter release operation;

DESCRIPTION OF PREFERRED EMBODIMENTS

Figure 1:
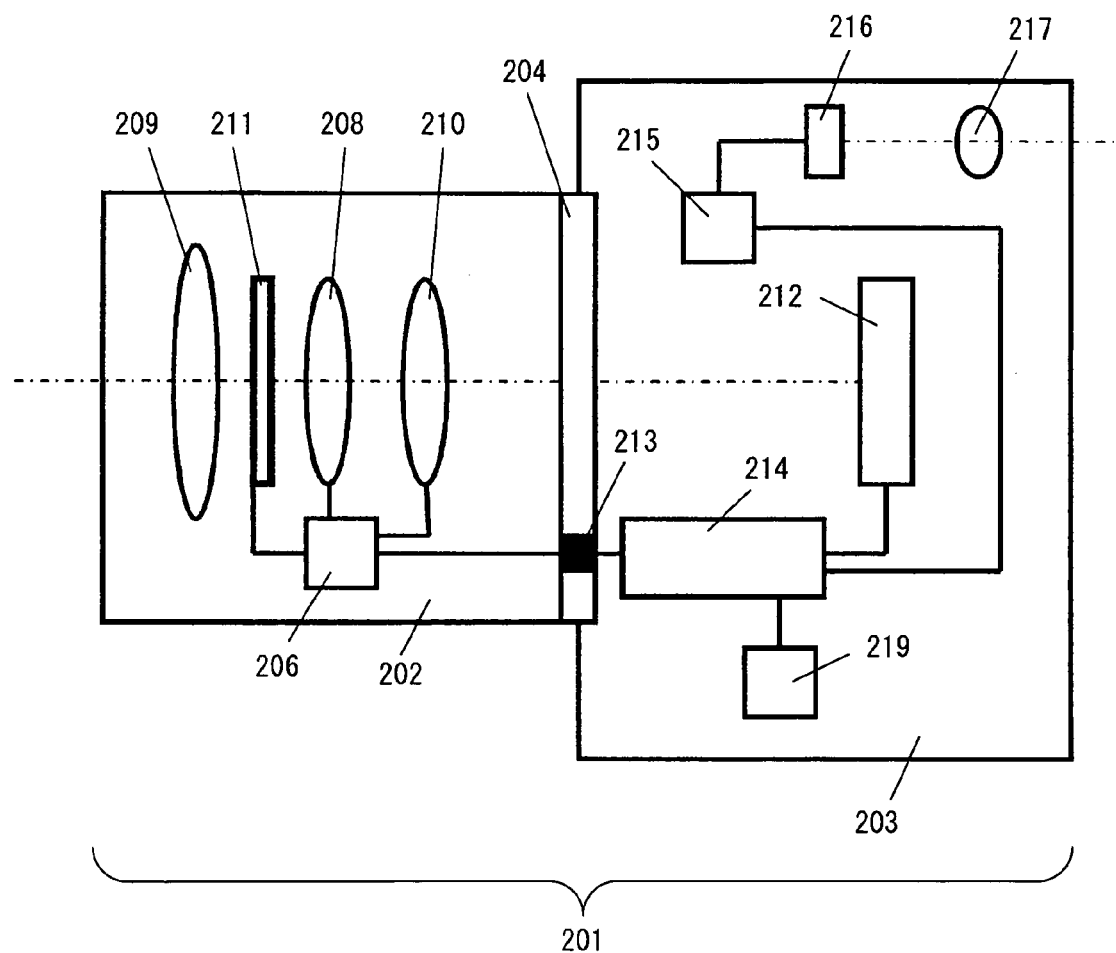
FIG. 1 is a lateral sectional view showing the configuration of a camera according to an embodiment of the present invention.

A digital still camera used in conjunction with exchangeable lenses, representing an example of an imaging apparatus equipped with the focus detection device achieved in an embodiment of the present invention is now explained. FIG. 1 is a lateral sectional view of the structure adopted in the camera in the embodiment. A digital still camera 201 achieved in the embodiment includes an exchangeable lens 202 and a camera body 203. The exchangeable lens 202 is mounted at the camera body 203 via amount unit 204. Exchangeable lenses 202 equipped with various imaging optical systems can be mounted at the camera body 203 via the mount unit 204.

The exchangeable lens 202 includes a zooming lens 208, a lens 209, a focusing lens 210, an aperture 211, a lens drive control device 206 and the like. The lens drive control device 206 is constituted with a microcomputer, a memory, a drive control circuit and the like (which are not shown). The lens drive control device 206 executes drive control to adjust the focus of the focusing lens 210 and adjust the opening diameter at the aperture 211 and detecting the states of the zooming lens 208, the focusing lens 210 and the aperture 211. In addition, the lens drive control device 206 engages in communication with a body drive control device 214 to be detailed later to transmit lens information to the body drive control device 214 and receive camera information from the body drive control device 214. The aperture 211 forms an opening with an adjustable diameter centered on the optical axis in order to adjust the light quantity and the extent of blur.

The camera body 203 includes, for example, an image sensor 212, a body drive control device 214, a liquid crystal display drive circuit 215, a liquid crystal display element 216, an eyepiece 217, and a memory card 219. The image sensor 212 has two-dimensionally arrayed imaging pixels in which focus detection pixels are incorporated in a unit corresponding to the focus detection points.

The body drive control device 214 includes a microcomputer, a memory, a drive control circuit and the like. The body drive control device 214 repeatedly executes drive control of the image sensor 212, reads out both image signals and focus detection signals, executes focus detection calculation based upon the focus detection signals, and adjusts the focus of the exchangeable lens 202. It also processes the image signals, records the processed image signals, controls camera operations and the like. In addition, the body drive control device 214 engages in communication with the lens drive control device 206 via an electrical contact 213 to receive the lens information and transmit the camera information (indicating the defocus amount, the aperture value and the like).

The liquid crystal display element 216 functions as a liquid crystal viewfinder (EVF: electronic viewfinder). The liquid crystal display element drive circuit 215A brings up a through image provided by the image sensor 212 on display at the liquid crystal display element 216. The photographer can observe the through image via the eyepiece lens 217. The memory card 219 is an image storage medium in which an image captured by the image sensor 212 is stored.

A subject image is formed on the light receiving surface of the image sensor 212 with a light flux having passed through the exchangeable lens 202. The subject image undergoes photoelectric conversion at the image sensor 212 and subsequently, image signals and focus detection signals are transmitted to the body drive control device 214.

The body drive control device 214 calculates the defocus amount indicating the extent of defocusing based upon the focus detection signals output from the focus detection pixels at the image sensor 212 and transmits this defocus amount to the lens drive control device 206. In addition, the body drive control device 214 processes the image signals provided from the image sensor 212 and stores the processed image signals into the memory card 219. It also provides through image signals from the image sensor 212 to the liquid crystal display element drive circuit 215 so as to bring up a through image on display at the liquid crystal display element 216. Moreover, the body drive control device 214 provides aperture control information to the lens drive control device 206 to enable control of the aperture 211 to be achieved.

The lens drive control device 206 adjusts the lens information in correspondence to the current focusing state, zooming state, aperture setting state, the open-aperture (maximum aperture F) and the like. More specifically, the lens drive control device 206 detects the points of the zooming lens 208 and the focusing lens 210 and the aperture value set for the aperture 211, and calculates lens information based upon the lens points and the aperture value. Alternatively, it may select the lens information corresponding to the lens points and the aperture value from a lookup table prepared in advance.

The lens drive control device 206 calculates a lens drive amount indicating the extent to which the lens is to be driven based upon the defocus amount having been received and drives the focusing lens 210 to a focusing point based upon the lens drive amount. In addition, the lens drive control device 206 drives the aperture 211 in correspondence to the aperture value it has received.

Figure 2:
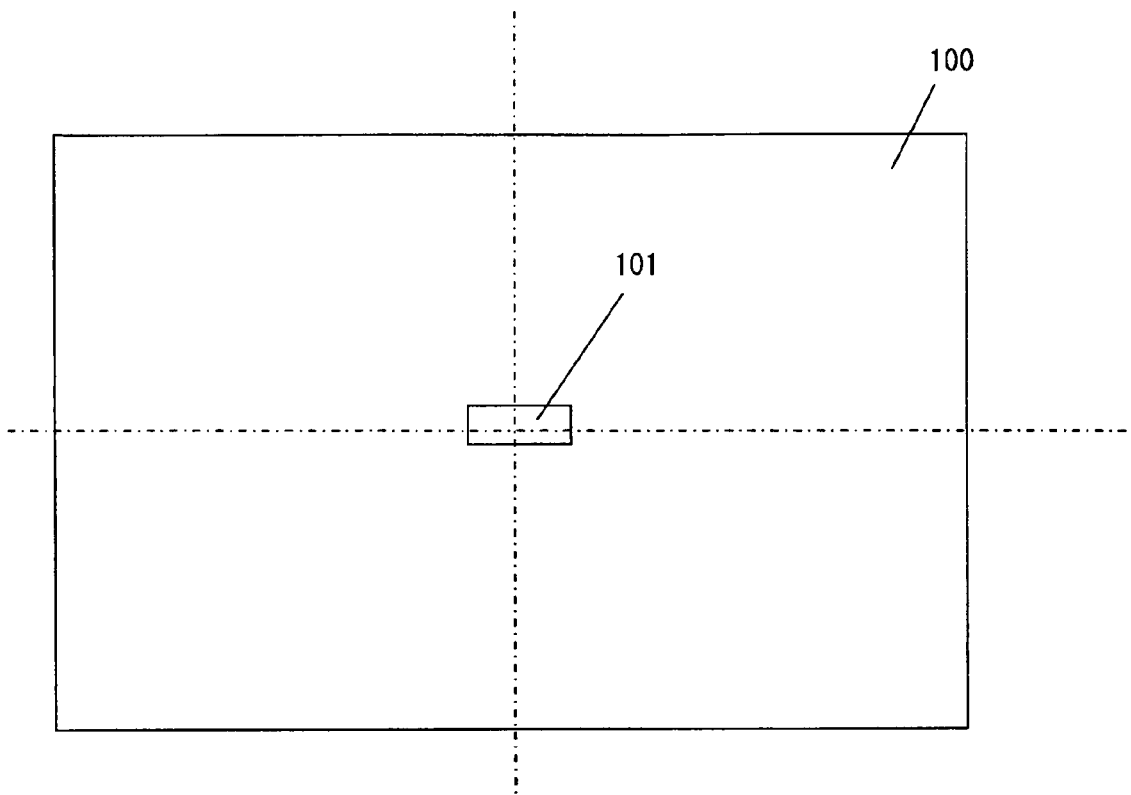
FIG. 2 is a diagram illustrating a focus detection point on the photographic field.

FIG. 2 shows a focus detection point set on the photographic image plane, indicating an example of an area (focus detection area or a focus detection point) at which an image is sampled on the photographic image plane along a focus detection pixel row for purposes of focus detection using the focus detection pixel row or line to be detailed below. In the present embodiment, a focus detection area 101 is set at the center of a rectangular photographic image plane 100. Focus detection pixels are disposed in a linear fashion in a direction along the longer side of the focus detection area 101 indicated as a rectangular area.

Figure 3:
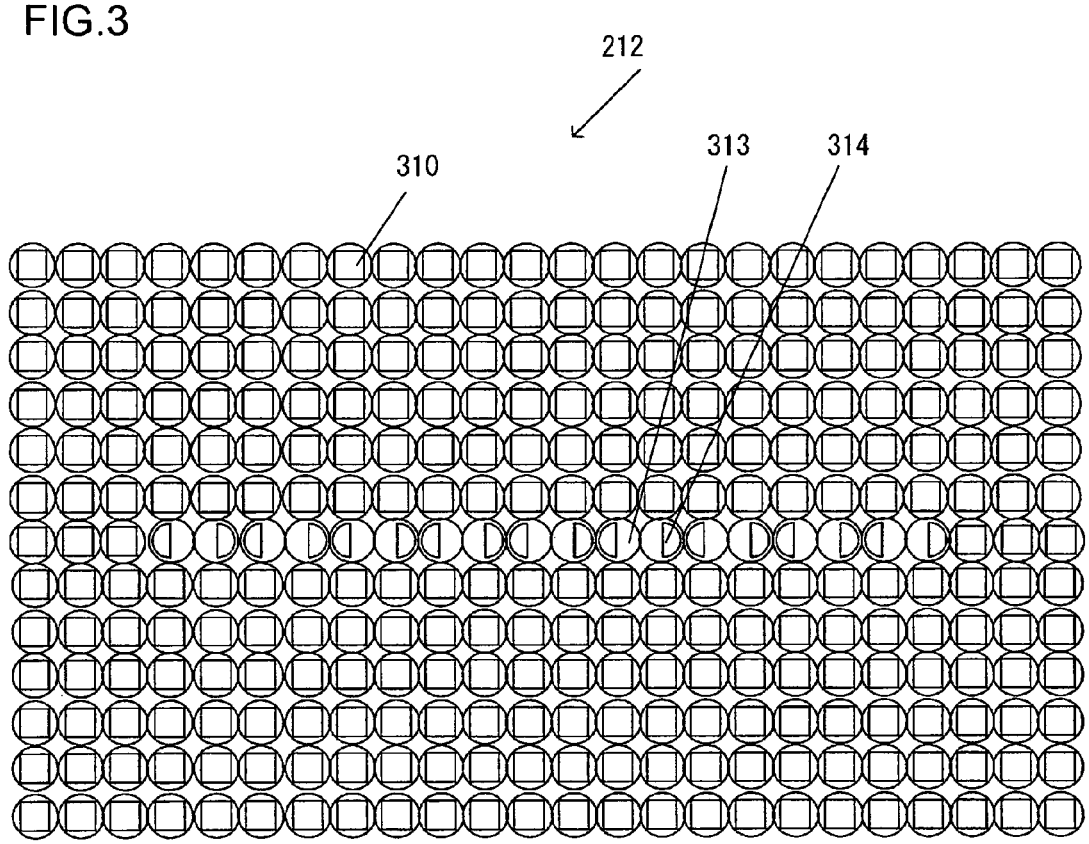
FIG. 3 is a front view showing a detailed construction of the image sensor.

FIG. 3 is a front view showing in detail the structure adopted in the image sensor 212, in an enlargement of the vicinity of one of the focus detection areas 101 on the image sensor 212. The image sensor 212 is constituted with imaging pixels 310 and focus detection pixels 313 and 314. The imaging pixels 310 are arranged two-dimensionally along the horizontal and vertical directions to form a square lattice array. On the other hand, the focus detection pixels 313 and 314 are disposed along the horizontal direction.

Figure 4:
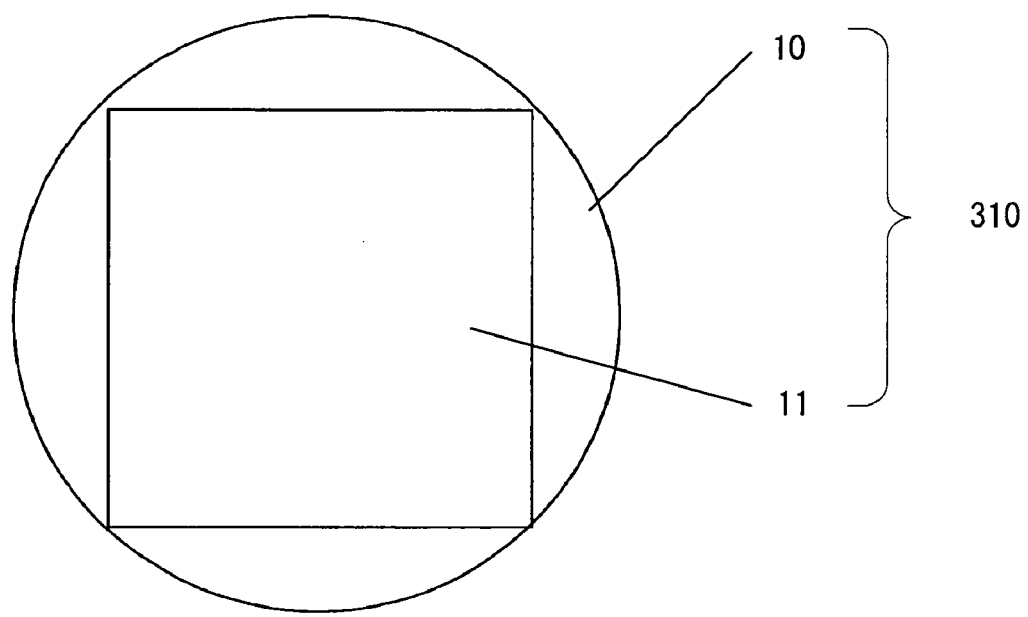
FIG. 4 is a front view showing details of an imaging pixel.
Figure 5A:
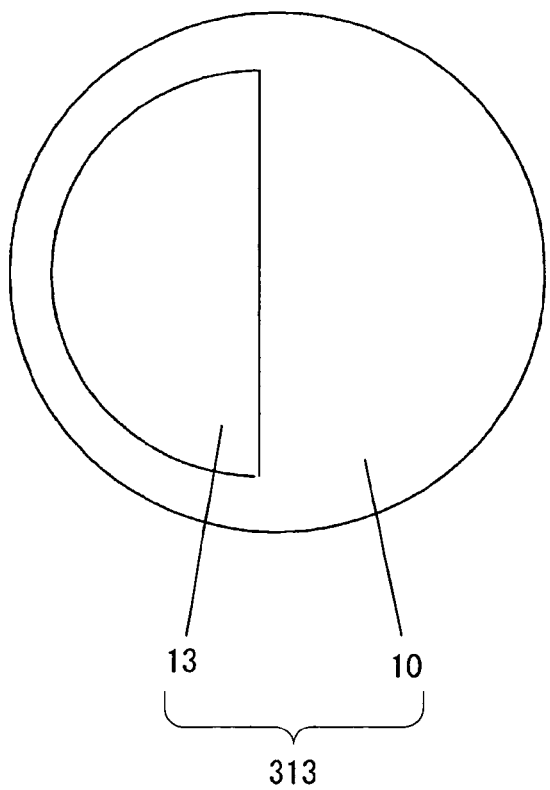
FIGS. 5A and 5B each present a front view showing details of the image sensor.
Figure 5B:
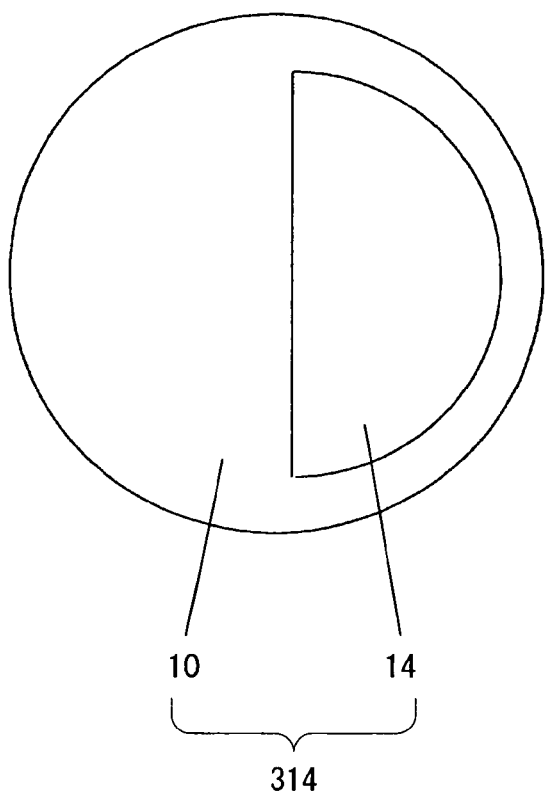

As shown in FIG. 4, the imaging pixels 310 each include a micro-lens 10 and a photoelectric conversion unit 11. As shown in FIG. 5A, the focus detection pixels 313 each include a micro-lens 10 and a photoelectric conversion unit 13. The photoelectric conversion unit 13 assumes the shape of a left half circle, the right side of which is substantially in contact with the vertical bisector extending along the diameter of the micro-lens 10. Further, as shown in FIG. 5B, the focus detection pixels 314 each include the micro-lens 10 and a photoelectric conversion unit 14. The photoelectric conversion unit 14 assumes the shape of a right half circle, the left side of which is substantially in contact with the vertical bisector extending along the diameter of the micro-lens 10.

Figure 6:
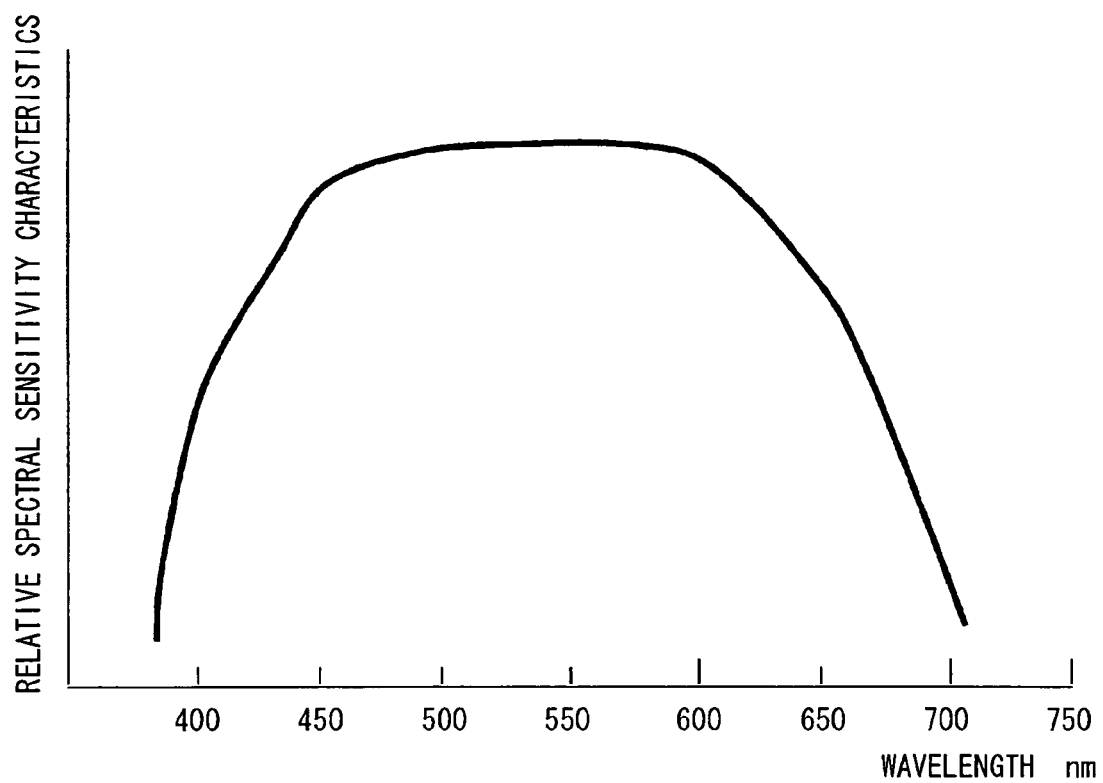
FIG. 6 is a diagram illustrating spectral sensitivity characteristics of the imaging pixels and the focus detection pixels.

When their micro-lenses 10 are aligned, the photoelectric conversion units 13 and 14 assume side-by-side positions, one taking up a right-side position and the other taking up a left-side position along the horizontal direction in the figures. The photoelectric conversion units 13 and 14 are symmetrical with each other relative to the vertical bisector extending along the diameter of the micro-lenses 10. The focus detection pixels 313 and the focus detection pixels 314 are disposed alternately along the horizontal direction in the figures, i.e., along the direction in which the photoelectric conversion units 13 and 14 are set next to each other. FIG. 6 shows the spectral sensitivity characteristics of the imaging pixels 310 and the focus detection pixels 313 and 314.

Figure 7:
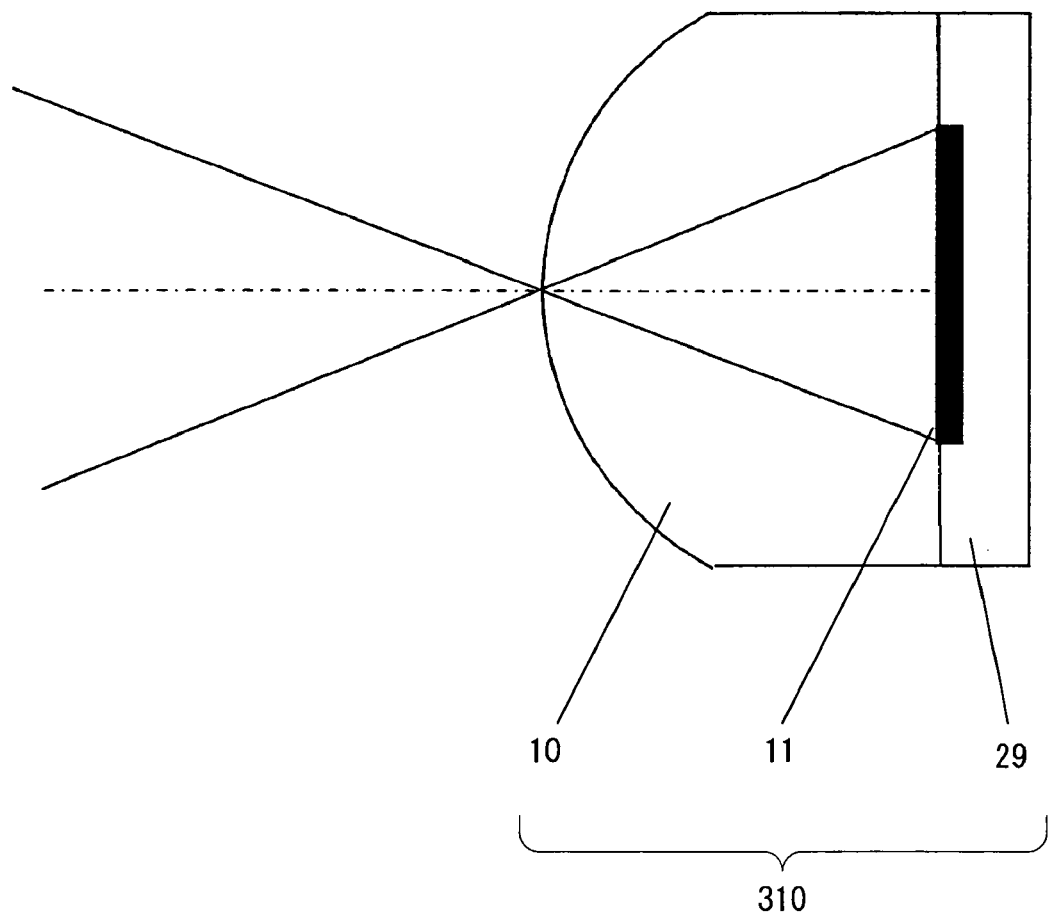
FIG. 7 is a cross-sectional view showing the imaging pixel.

FIG. 7 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29.

Figure 8A:
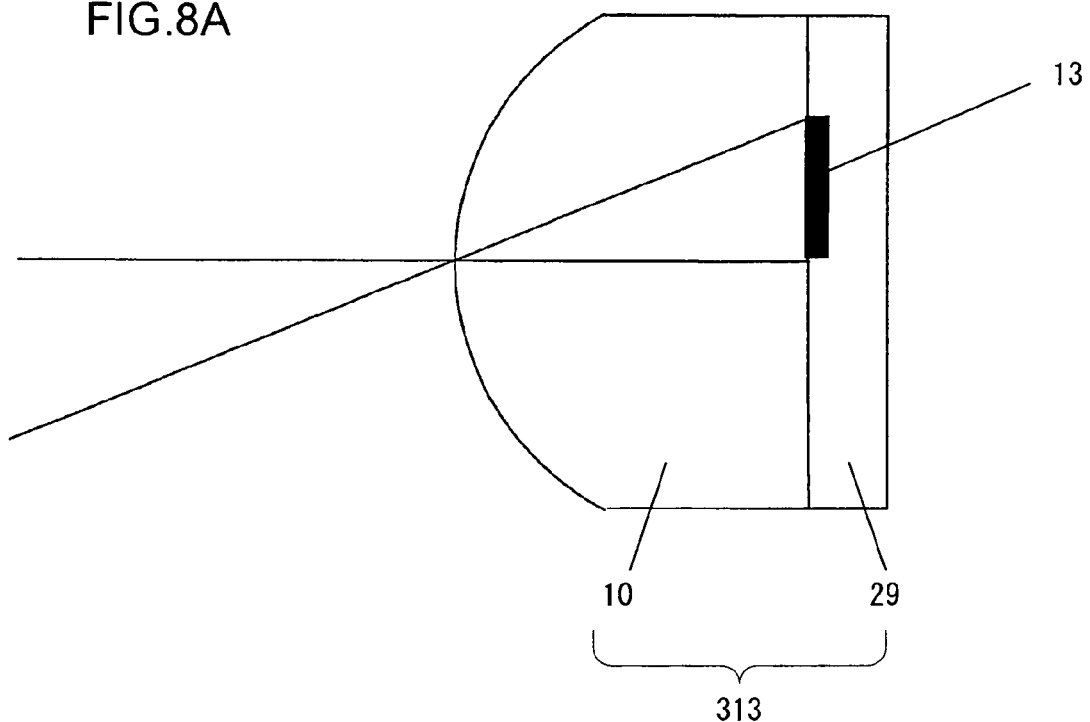
FIGS. 8A and 8B each are a cross-sectional view showing the focus detection pixel.

FIG. 8A presents a sectional view of a focus detection pixel 313. The micro-lens 10 is disposed to the front of the focus detection photoelectric conversion unit 13 at the focus detection pixel 313 so as to project the photoelectric conversion unit 13 along the frontward direction via the micro-lens 10. The photoelectric conversion unit 13 is formed on the semiconductor circuit substrate 29. The micro-lens 10 is formed thereon integrally and fixedly by the production process of a semiconductor image sensor. The photoelectric conversion unit 13 is disposed on one side of the optical axis of the micro-lens 10.

Figure 8B:
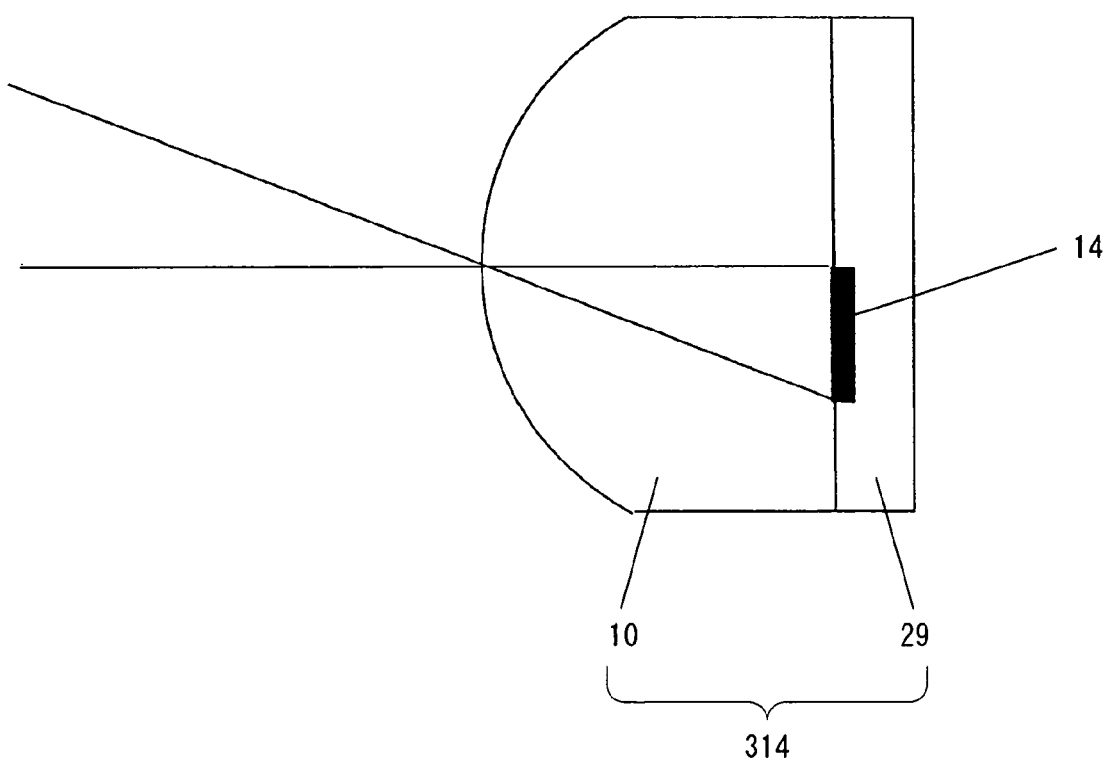

FIG. 8B presents a sectional view of a focus detection pixel 314. The micro-lens 10 is disposed to the front of the focus detection photoelectric conversion unit 14 at the focus detection pixel 314 so as to project the photoelectric conversion unit 14 along the frontward direction via the micro-lens 10. The photoelectric conversion unit 14 is formed on the semiconductor circuit substrate 29. The micro-lens 10 is formed thereon as a fixed, integral part through a semiconductor image sensor manufacturing process. The photoelectric conversion unit 14 is disposed on one side of an optical axis of the micro-lens 10 and on the side opposite to the photoelectric conversion unit 13.

Figure 9:
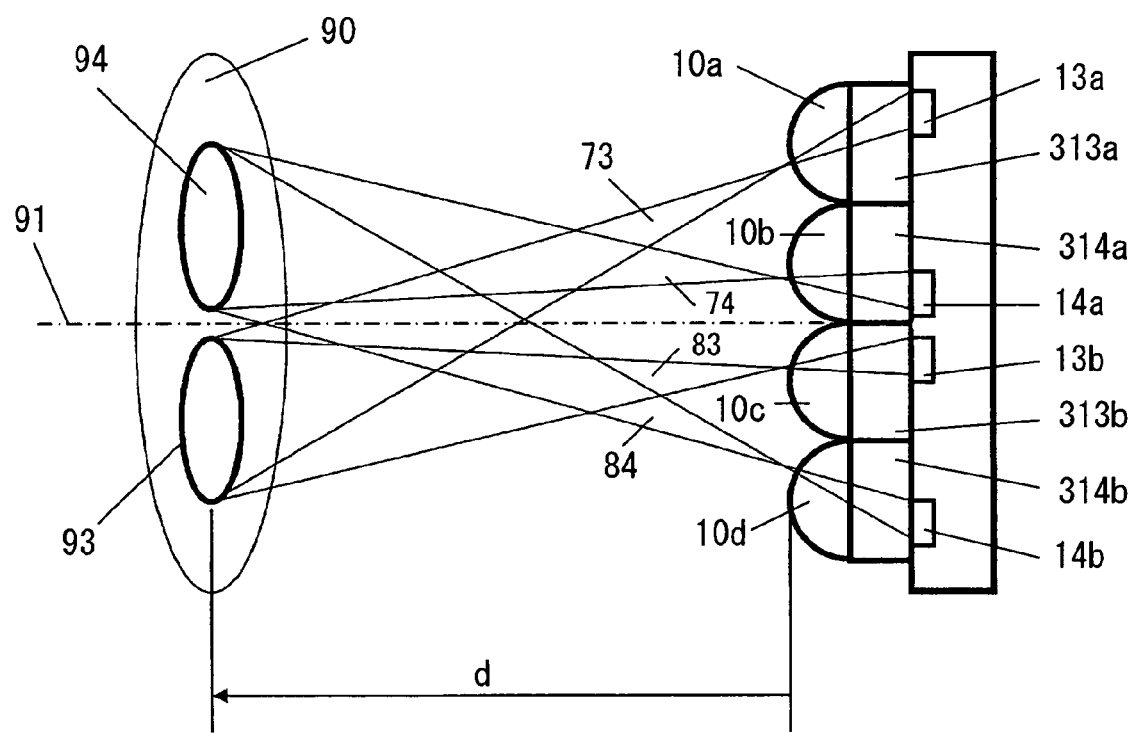
FIG. 9 is a diagram showing the configuration of the focus detection optical system according to a split-pupil phase difference detection method using micro-lenses.

Focus detection adopting a split-pupil phase difference detection method, executed by using micro-lenses, is now described in reference to FIG. 9. Reference numeral 90 indicates the exit pupil set over a distance d along the frontward direction from the micro-lenses disposed near the predetermined imaging plane of the exchangeable lens 202 (see FIG. 1). The distance d is determined in correspondence to the curvature of the micro-lenses, the refractive index of the micro-lenses, the distance between the micro-lenses and the photoelectric conversion units and the like, and is referred to as a distance of pupil for focus detection in this description. Reference numeral 91 indicates the optical axis of the exchangeable lens, reference numerals 10*a* to 10*d* each indicate a micro-lens, reference numerals 13*a*, 13*b*, 14*a*, and 14*b* each indicate a photoelectric conversion unit, reference numerals 313*a*, 313*b*, 314*a*, and 314*b* each indicate a focus detection pixel, and reference numerals 73, 74, 83, and 84 each indicate a focus detection light flux.

Reference numeral 93 indicates an area defined by the photoelectric conversion units 13*a* and 13*b* projected via the micro-lenses 10*a* and 10*c*, and this area is hereafter referred to as a pupil for focus detection in the description. While the area is shown as an elliptical area so as to simplify the illustration in the drawing, the area actually has a shape corresponding to an enlarged projection of the shape of the photoelectric conversion unit. Similarly, reference numeral 94 indicates an area defined by the photoelectric conversion units 10*b* and 10*d* projected via the micro-lenses 14*a* and 14*b* and this area is hereafter referred to as a pupil for focus detection in the description. While the area is shown as an elliptical area so as to simplify the illustration in the drawing, the area actually has a shape corresponding to an enlarged projection of the shape of the photoelectric conversion unit.

While FIG. 9 schematically shows four focus detection pixels 313*a*, 313*b*, 314*a*, and 314*b* disposed in sequence next to each other, the photoelectric conversion units of other focus detection pixels, too, receive light fluxes arriving at their micro-lenses from the respective pupils for focus detection. The focus detection pixels are arrayed in a direction matching the direction in which the pair of pupils for focus detection is set side-by-side, that is, in a direction matching the direction in which the pair of photoelectric conversion units is set side-by-side.

The micro-lenses 10*a*~10*d* are disposed near the predetermined imaging plane of the exchangeable lens 202 (see FIG. 1), and as the shapes of the photoelectric conversion units 13*a*, 13*b*, 14*a*, and 14*b* disposed behind the micro-lenses 10*a*~10*d* are projected onto the exit pupil 90 distanced from the micro-lenses 10*a*~10*d* by the distance of pupil for focus detection d, the projected shapes define the pupils for focus detection 93 and 94. In other words, the directions along which the photoelectric conversion units at individual pixels are projected are determined so that the projected shapes (pupils for focus detection 93 and 94) of the photoelectric conversion units at the individual pixels are overlapped on the exit pupil 90 set apart by the projection distance d.

The photoelectric conversion unit 13*a* outputs a signal corresponding to the intensity of an image formed on the micro-lens 10*a* with the light flux 73 having passed through the pupil for focus detection 93 and having advanced toward the micro-lens 10*a*. The photoelectric conversion unit 13*b* outputs a signal corresponding to the intensity of an image formed on the micro-lens 10*c* with the light flux 83 having passed through the pupil for focus detection 93 and having advanced toward the micro-lens 10*c*. The photoelectric conversion unit 14*a* outputs a signal corresponding to the intensity of an image formed on the micro-lens 10*b* with the light flux 74 having passed through the pupil for focus detection 94 and having advanced toward the micro-lens 10*b*. The photoelectric conversion unit 14*b* outputs a signal corresponding to the intensity of an image formed on the micro-lens 10*d* with the light flux 84 having passed through the pupil for focus detection 94 and having advanced toward the micro-lens 10*d*.

By linearly disposing a large number of focus detection pixels each structured as described above and integrating the outputs from the photoelectric conversion units at the individual focus detection pixels into output groups each corresponding to one of the two pupils 93 and 94 for focus detection, information related to the intensity distributions of the pair of images formed on the focus detection pixel row with the individual focus detection light fluxes passing through the pupil 93 for focus detection and the pupil 94 for focus detection, respectively, are obtained. Image shift detection arithmetic processing (correlation arithmetic processing, phase difference detection processing), to be detailed later, is subsequently executed by using the information thus obtained so as to detect the extent of image shift manifested by the pair of images through the split-pupil phase difference detection method. Then, by executing a conversion operation on the image shift quantity in correspondence to the distance between the gravitational centers (center points of gravity) of the pair of pupils for focus detection, the deviation (defocus amount) of the current imaging plane (the image forming plane at the focus detection point corresponding to the point assumed by the micro-lens array on the predetermined imaging plane) relative to the predetermined imaging plane is calculated.

Figure 10:
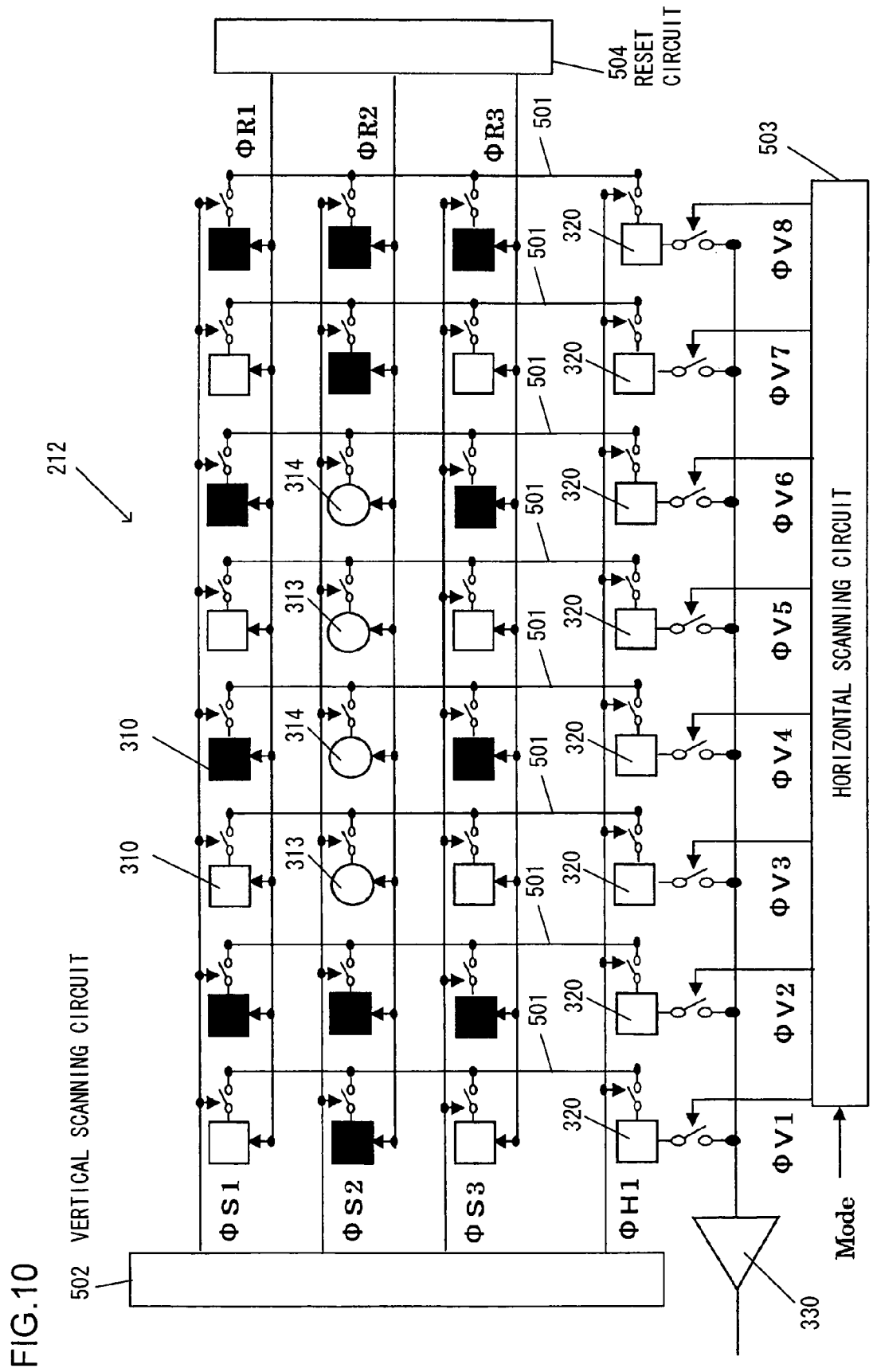
FIG. 10 is a conceptual diagram showing the circuit structure of the image sensor.

FIG. 10 is a conceptual diagram showing the circuit structure of the image sensor 212 in a simplified layout of 8 pixels along the horizontal direction by 3 pixels along the vertical direction. The image sensor 212 according to an embodiment of the present invention is achieved as a CMOS image sensor. In FIG. 10, there are disposed a total of four focus detection pixels 313 and 314 (indicated by white circles in the figure) at the center of the second row from above. The four focus detection pixels 313 and 314 are shown to represent a plurality of imaging pixels that are included in the rows where imaging pixels and focus detection pixels are disposed on the image sensor 212 as mixed with each other. In addition, two imaging pixels 310 (indicated by black square circles in the figure) are disposed on both sides of the four focus detection pixels 313 and 314 along the horizontal direction. The four imaging pixels are shown to represent a plurality of imaging pixels that are included in the rows where imaging pixels and focus detection pixels are disposed on the image sensor 212 as mixed with each other. On the other hand, in the first and third rows from above, there are disposed only the imaging pixels 310 (indicated by white and black squares in the figure) shown to represent the rows in which only a plurality of imaging pixels are disposed above and below the row in which the focus detection pixels are disposed on the image sensor 212.

In FIG. 10, line memories 320 (indicated by white squares in the figure) each constitute a buffer where the pixel signals from the pixels in a given row are temporarily held. The pixel signals output from the imaging pixels 310 and the focus detection pixels 313 and 314 are controlled in units of the individual rows independently of one another based upon control signals (ΦS1~ΦS3) generated by the vertical scanning circuit 502. The pixel signals at pixels selected based upon control signals (ΦS1~ΦS3) are output to the corresponding vertical signal lines 501. The pixel signals output to vertical signal lines 501 are latched by the line memories 320 in response to a control signal ΦH1 generated by the vertical scanning circuit 502. The pixel signals held in the line memories 320 are sequentially transferred to an output circuit 330 in response to control signals (ΦV1~ΦV8) generated by a horizontal scanning circuit 503 and the transferred signals are then amplified to a specific preset degree at the output circuit 330, from which they are output to the outside. Note that the pixel signals held in the line memories 320 are reset in synchronization with the rising edges of the control signals ΦS1~ΦS3.

Mode signals for switching the operation modes from one to another are supplied to the horizontal scanning circuit 503 from the outside. The horizontal scanning circuit 503 changes the pixel selection pattern at the control signals (ΦV1~ΦV8) in response to the signal level (high level or low level), thus switching the modes between an ordinary pixel signal output operation (a mode in which whole pixels are read out, hereafter "whole-pixels-read-out mode") and an operation in which pixels are selected from among the whole pixels with skipping pixels (also, referred to "pixel-skip") and signals are output from the selected pixels.

Figure 11:
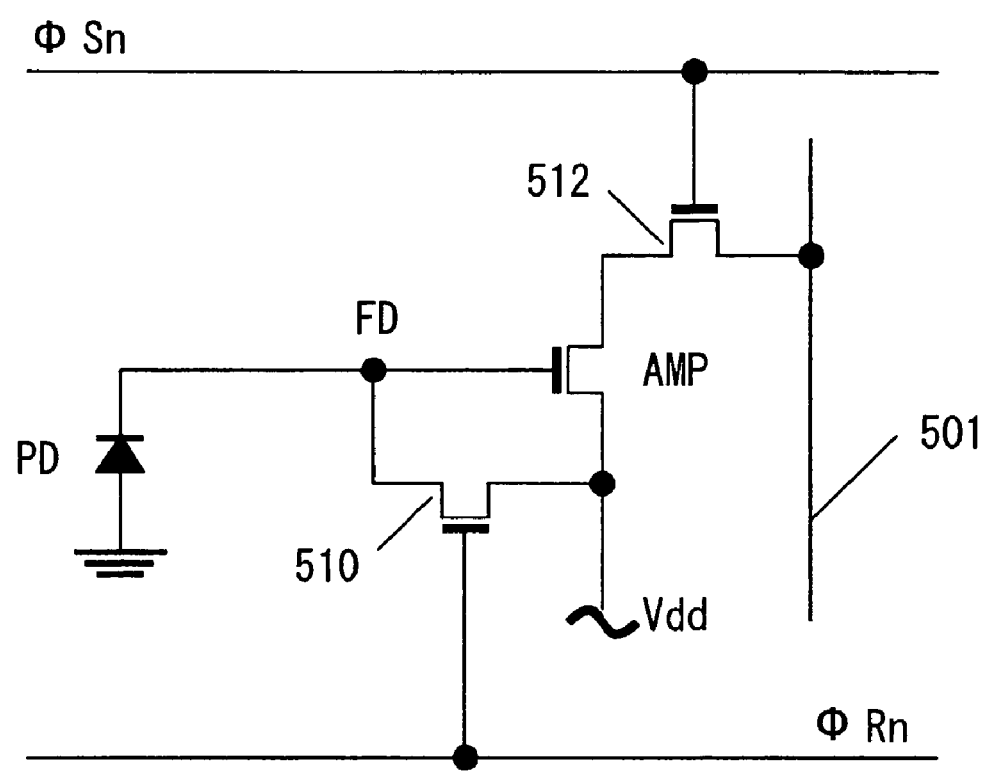
FIG. 11 is a detailed circuit diagram of the imaging pixels and the focus detection pixels of the image sensor.

FIG. 11 is a detailed circuit diagram pertaining to the imaging pixels 310 and the focus detection pixels 313 and 314 on the imaging sensor 212 shown in FIG. 10. The photoelectric conversion units of these pixels each are constituted with a photodiode (PD). The electrical charge stored at the PD is stored in a floating diffusion (FD) layer. The FD is connected to the gate of an amplifier MOS transistor (AMP). The AMP generates a signal corresponding to the quantity of electrical charge stored in the FD layer (hereafter, FD unit).

The FD unit is connected to a voltage source Vdd via a reset MOS transistor 510 and as the reset MOS transistor 510 is turned ON according to a control signal ΦRn (ΦV1~ΦV3), the electrical charge having been collected in the FD unit and the PD is cleared, thereby resetting the FD unit and the PD. The output from the AMP is connected to the vertical output line 501 via a row selector MOS transistor 512, and as the row selector MOS transistor 512 is turned on based upon a control signal ΦSn (ΦS1~ΦS6), the output from the AMP is output to the vertical output line 501.

Figure 12:
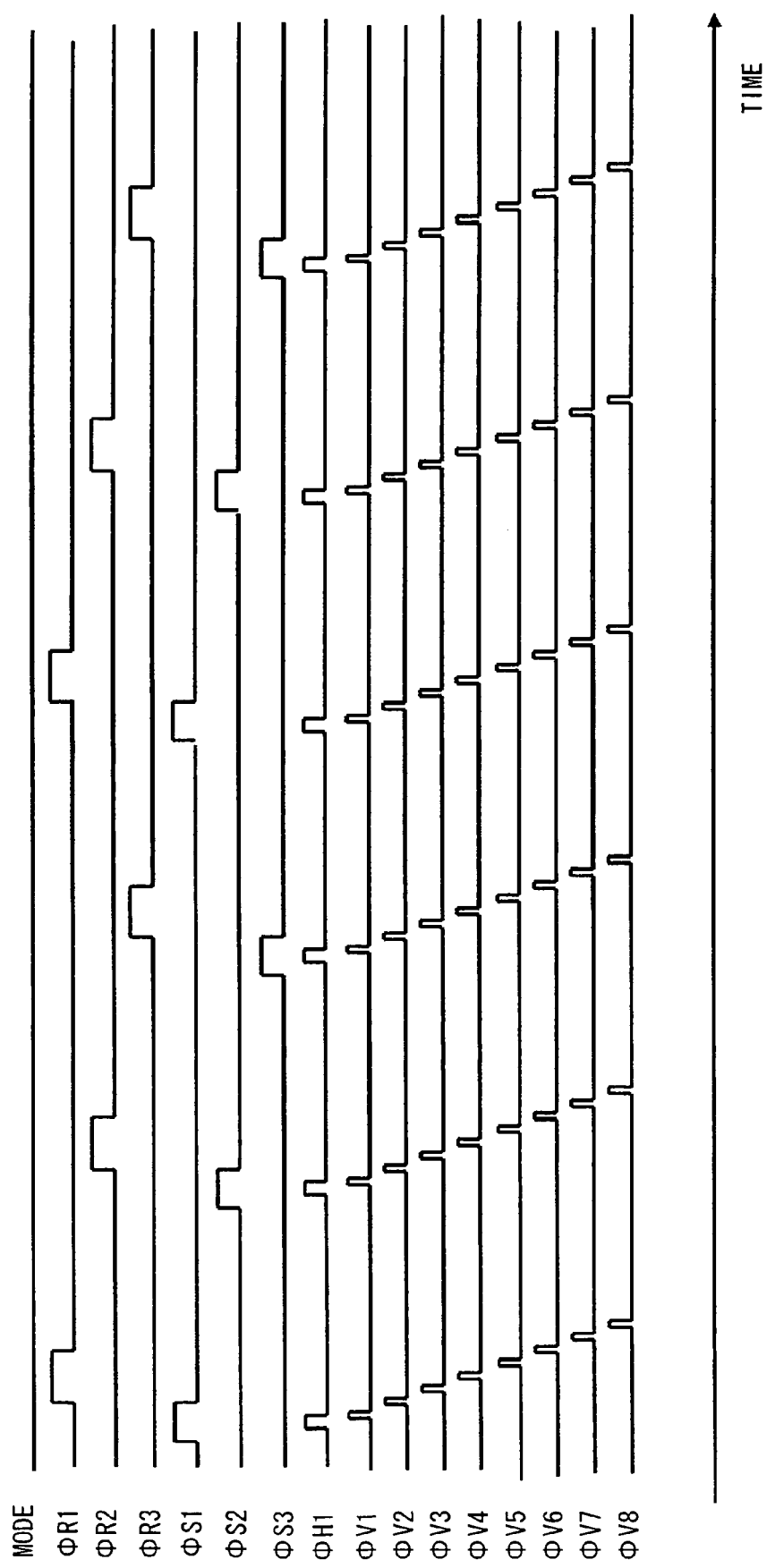
FIG. 12 is a timing chart illustrating the operation mode of the image sensor shown in FIG. 10 in an ordinary operation mode.

FIG. 12 is a timing chart of the operation executed in the image sensor 212 in the ordinary operation mode. When the external signal Mode is at the low level, the image sensor 212 operates in the ordinary operation mode (whole-pixels-read-out mode). As shown in FIG. 10, the imaging pixels 310 in the first row are selected based upon the control signal ΦS1 generated by the vertical scanning circuit 502 and the pixel signals from the selected imaging pixels 310 are output to the vertical signal lines 501. The pixel signals from the imaging pixels in the first row, having been output to the vertical signal lines 501, are temporarily held in the line memories 320 based upon a control signal ΦH1 provided in synchronization with the control signal ΦS1. The pixel signals from the imaging pixels 310 in the first row held in the line memories 320 are transferred to the output circuit 330 in response to the control signals ΦV1~ΦV8 issued sequentially from the horizontal scanning circuit 503. They are then amplified to the specific preset extent at the output circuit 330 output to the outside.

As the transfer of the pixel signals at the imaging pixels 310 in the first row to line memories 320 ends, the imaging pixels 310 in the first row are reset in response to the control signal ΦR1 issued by the reset circuit 504 (see FIG. 10) and the subsequent charge storage starts at the imaging pixels 310 in the first row at the trailing edge of the control signal ΦR1. As the output circuit 330 ends the output of the pixel signals from the imaging pixels 310 in the first row, the imaging pixels 310 and the focus detection pixels 313 and 314 in the second row are selected based upon the control signal ΦS2 issued by the vertical scanning circuit 502 and the pixel signals from the selected imaging pixels 310 and the focus detection pixels 313 and 314 are output to the vertical signal lines 501. Subsequently, similarly to the operation of the pixels in the first row above, the pixel signals from the pixels are held, the pixels are reset, the pixel signals are output, and next storage of charge is started in the imaging pixels 310 and the focus detection pixels 313 and 314 in the second row.

Subsequently, pixel signals are held, the pixels are reset, the pixel signals are output, and next charge storage is started in the imaging pixels 310 in the third row. When the output of the pixel signals from all the pixels ends, the process is returned to the first row again and the operations described above are repeated periodically.

By adjusting the pulse width of the control signals ΦR1~ΦR3, the charge storage time (exposure time) at the imaging pixels 310 and the focus detection pixels 313 and 314 can be controlled. FIG. 12 presents a timing chart according to which electric charge storage and pixel signal output from the first row to the third row are periodically repeated. However, only one cycle of electric charge storage and pixel signal output may be performed in a shingle shot. Such an ordinary operation mode (whole-pixels-read-out mode) is executed upon imaging.

Figure 13:
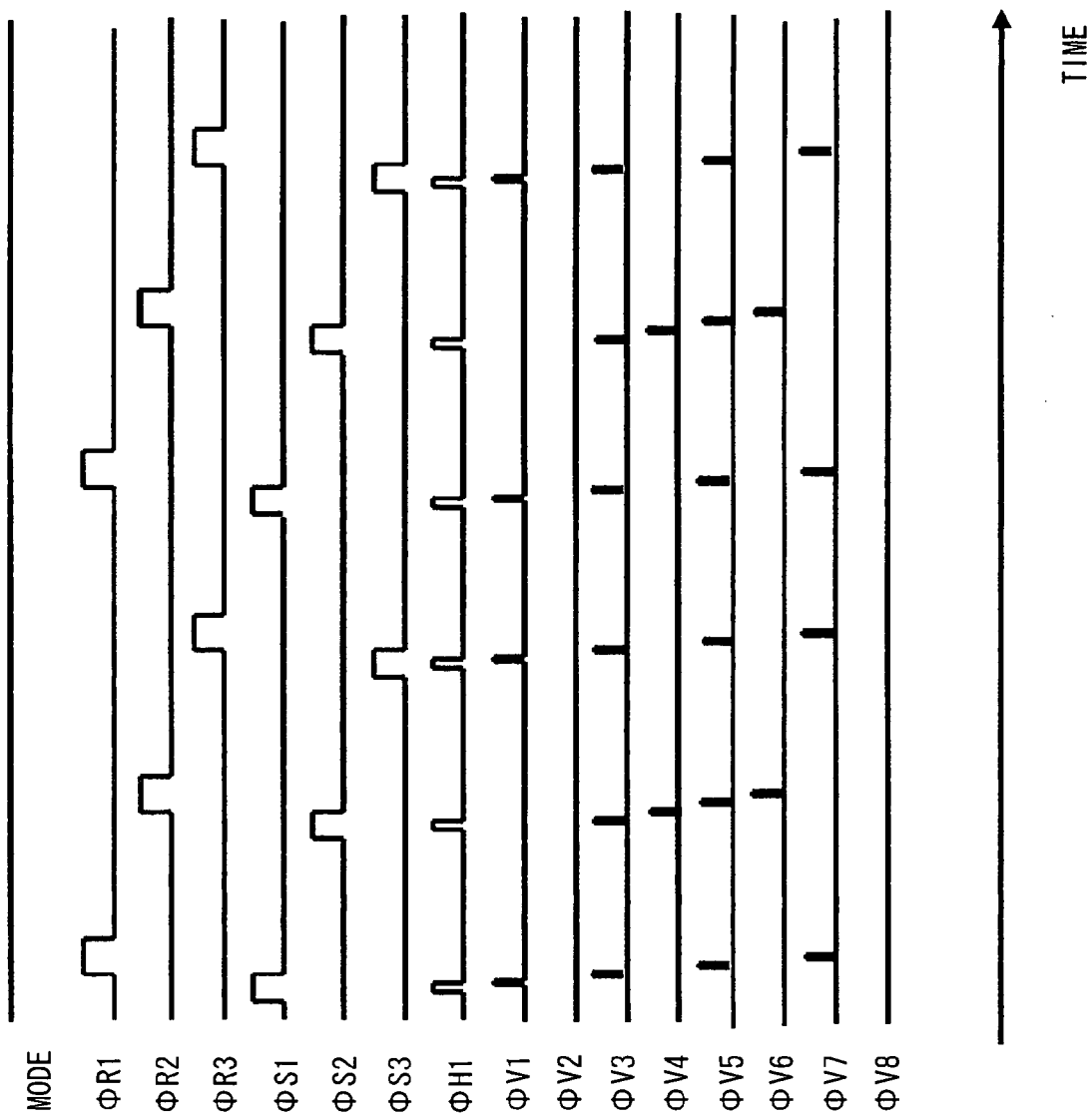
FIG. 13 is a timing chart illustrating the operation mode of the image sensor shown in FIG. 10 in a pixel-skip mode.
Figure 14:
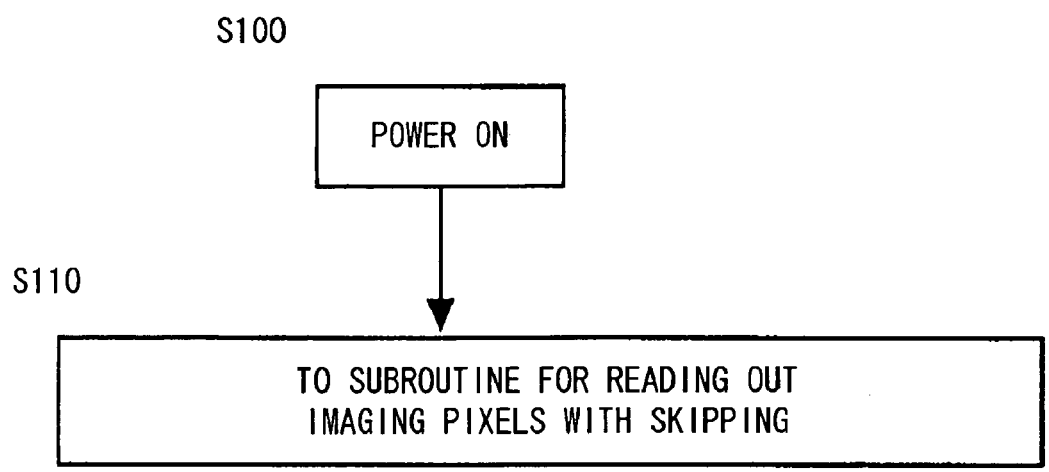
FIG. 14 is a flowchart illustrating the operation of the digital still camera (imaging apparatus) according to an embodiment of the present invention.

FIG. 13 is a timing chart of the operation executed in the image sensor 212 in the skip mode. When the external signal Mode at the high level is input, the image sensor 212 operates in the skip mode. In the skip mode, if the body drive control device 214 determines that only the imaging pixels 310 are disposed in the rows (the first row and the third row in the example shown in FIG. 10) in which the pixel signals are to be read out, the body drive control device 214 performs selection of pixels with skipping every another pixel along the horizontal direction. As a result, the pixel signals output from the selected pixels are read out in the rows in which only the imaging pixels 310 are disposed. If the body drive control device 214 determines that the focus detection pixels 313 and 314 are included in the row (the second row in the example shown in FIG. 10) in which the pixel signals are to be read out, the body drive control device 214 reads out the pixel signals continuously without skipping the focus detection pixels 313 and 314.

The imaging pixels 310 in the first row are selected based upon the control signal ΦS1 generated by the vertical scanning circuit 502 and the pixel signals from the selected imaging pixels 310 are output to the vertical signal lines 501. The pixel signals from the imaging pixels in the first row, having been output to the vertical signal lines 501, are temporarily held in the line memories 320 based upon the control signal ΦH1 generated in synchronization with the control signal ΦS1. The pixel signals from the imaging pixels 310 in the first row held in the line memories 320 are transferred to the output circuit 330 in response to the control signals ΦV1, ΦV3, ΦV5, and ΦV7. They are then amplified to the specific preset extent at the output circuit 330 and output to the outside.

In the skip-read-out mode, the control signals ΦV2, ΦV4, ΦV6, and ΦV8 are not generated, so that the imaging pixels 310 at the second, fourth, sixth and eighth columns are skipped. The pixel signals from the skipped imaging pixels (i.e., signals from the imaging pixels 310 indicated by black squares in FIG. 10) are not output and only the pixel signals from the imaging pixels 310 at the first, third, fifth, and seventh columns (i.e., signals from the imaging pixels 310 indicated by white squares in FIG. 10) are output. As the transfer of the pixels signals from the imaging pixels 310 in the first row ends, the imaging pixels 310 in the first row are reset in response to the control signal ΦR1 issued by the reset circuit 506 and the subsequent charge storage starts at the imaging pixels 310 in the first row at the trailing edge of the control signal ΦR1.

As the output circuit 330 ends the output of the pixel signals from the imaging pixels 310 in the first row, the imaging pixels 310 and the focus detection pixels 313 and 314 in the second row are selected based upon the control signal ΦS2 issued by the vertical scanning circuit 502. The pixel signals from the selected imaging pixels 310 are output to the vertical signal lines 501. The pixel signals from the imaging pixels in the second row, having been output to the vertical signal lines 501, are temporarily held in the line memories 320 based upon a control signal ΦH1 provided in synchronization with the control signal ΦS1. The pixel signals from the pixels in the second row held in the line memories 320 are transferred to the output circuit 330 in response to the control signals ΦV3, ΦV4, Φ5, and ΦV6 issued from the horizontal scanning circuit 503. They are then amplified to the specific preset extent at the output circuit 330 and output to the outside.

In the skip-read-out mode, the control signals ΦV1, ΦV2, ΦV7, and ΦV8 are not generated, so that the imaging pixels 310 at the first, second, seventh and eighth columns are skipped. The pixel signals from the skipped pixels (i.e., signals from the imaging pixels 310 indicated by black squares in FIG. 10) are not output. On the other hand, the control signals ΦV3, ΦV4, ΦV5, and ΦV6 are continuously generated, so that only the pixel signals from the focus detection pixels at the third, fourth, fifth, and sixth columns (i.e., signals from the focus detection pixels 313 and 314 indicated by white circles in FIG. 10) are output. As the transfer of the pixels signals from the pixels in the second row ends, the imaging pixels 310 and the focus detection pixels 313 and 314 in the second row are reset in response to the control signal ΦR1 issued by the reset circuit 504 and the subsequent charge storage starts at the imaging pixels 310 and the focus detection pixels 313 and 314 in the second row at the trailing edge of the control signal ΦR2.

As the output circuit 330 ends the output of the pixel signals from the imaging pixels 310 in the second row, the imaging pixels 310 in the third row are selected based upon the control signal ΦS3 issued by the vertical scanning circuit 502. The pixel signals from the selected imaging pixels 310 are output to the vertical signal lines 501. The pixel signals from the imaging pixels in the third row, having been output to the vertical signal lines 501, are temporarily held in the line memories 320 based upon a control signal ΦH1 provided in synchronization with the control signal ΦS3. The pixel signals from the pixels in the third row held in the line memories 320 are transferred to the output circuit 330 in response to the control signals ΦV1, ΦV3, ΦV5, and ΦV7 issued from the horizontal scanning circuit 503. They are then amplified to the specific preset extent at the output circuit 330 and output to the outside.

In the skip-read-out mode, the control signals ΦV2, ΦV4, ΦV6, and ΦV8 are not generated, so that the imaging pixels 310 at the second, fourth, sixth and eighth columns are skipped. The pixel signals from the skipped pixels (i.e., signals from the imaging pixels 310 indicated by black squares in FIG. 10) are not output whereas only the pixel signals from the imaging pixels 310 at the first, third, fifth, and seventh columns (i.e., signals from the imaging pixels 310 indicated by white squares in FIG. 10) are output. As the transfer of the pixel signals from the pixels in the third row ends, the imaging pixels 310 in the third row are reset in response to the control signal ΦR3 issued by the reset circuit 504 and the subsequent charge storage starts at the imaging pixels 310 in the third row at the trailing edge of the control signal ΦR3. When the output of pixel signals from all the pixels ends, the operation is returned to the first row again and the above-mentioned operation is repeated periodically.

FIGS. 12 and 13, in which the horizontal axis indicates time scale, show that the number of pixel signals output in the skip-read-out mode is half the number of pixel signals output in the whole-pixels-read-out mode. Therefore, if the image sensor is operated in such a manner that the number of times of output of pixel signals for the same time period is the same for both the modes, it can output a double frame number of images for the same time period in the skip-read-out mode as compared with the ordinary operation mode (whole-pixels-read-out mode). This can increase the speed of updating display in the live view display and cause high-quality image display to be achieved. As mentioned above, the operation of reading out the same frame in the skip-read-out mode is executed such that pixels are selected by skipping every another pixel along the horizontal direction and the image signals output from the selected pixels are read out in the row in which only the imaging pixels 310 are disposed (i.e., in the first row and the third row in the example shown in FIG. 10). On the other hand, in the row in which the focus detection pixels 313 and 314 are disposed (i.e., in the second row in the example shown in FIG. 10), the focus detection pixels 313 and 314 are not skipped, and the pixels signals therefrom are continuously readout. Therefore, the focus detection cycle that performs calculation of image shift with high accuracy by using the focus detection pixels 313 and 314 without skips can be shortened while performing live view display at high speed.

FIGS. 14 to 17 each are a flowchart illustrating the operation of the digital still camera (imaging apparatus) shown in FIG. 1. The body drive control device 214 starts the operation upon turning ON of the power source at the step S100 in FIG. 14 and causes the operation to jump to a subroutine for reading pixel signals from the image sensor (hereafter, "image sensor skip-read-out subroutine") shown in FIG. 15 at a step S110.

Figure 15:
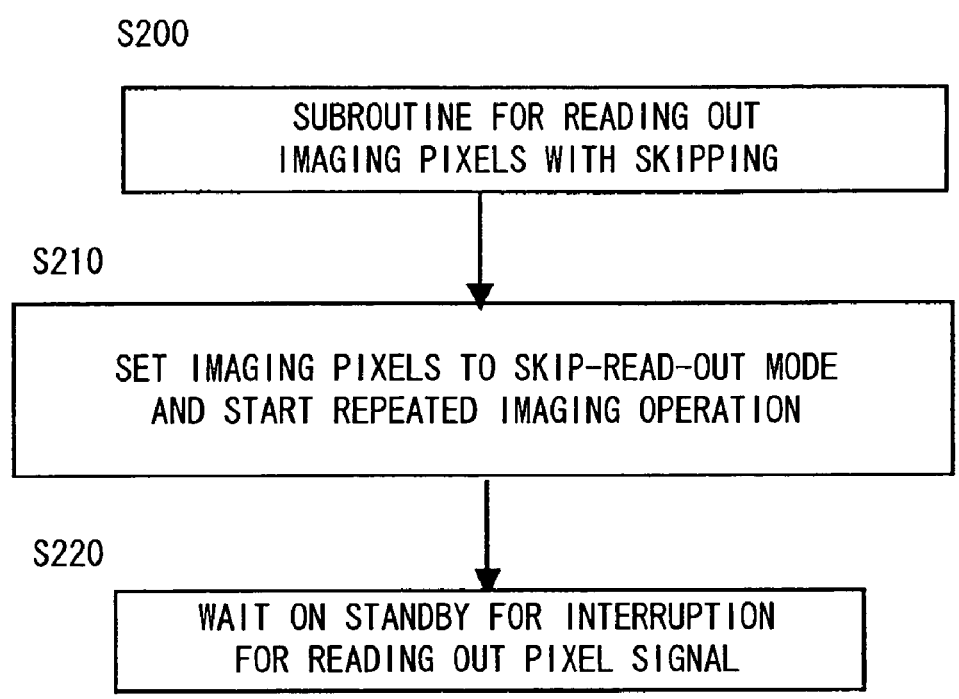
FIG. 15 is a flowchart illustrating an imaging pixels skipping read-out subroutine.

FIG. 15 is a flowchart of the operation of the subroutine for image sensor skip-read-out subroutine. The skip-read-out operation on the image sensor 212 is started by the body drive control device 214 at a step S200. The image sensor 212 is set to a skip-read-out mode and a repeated imaging operation in this mode is started at a step S210. In a subsequent step S220, the image sensor 212 is set to the skip-read-out output mode and a repeated imaging operation (periodical operation) in this mode is started. In the step S220, occurrence of an interruption for reading out pixel signals (hereafter, "pixel signal read-out interruption") is watched.

Figure 16:
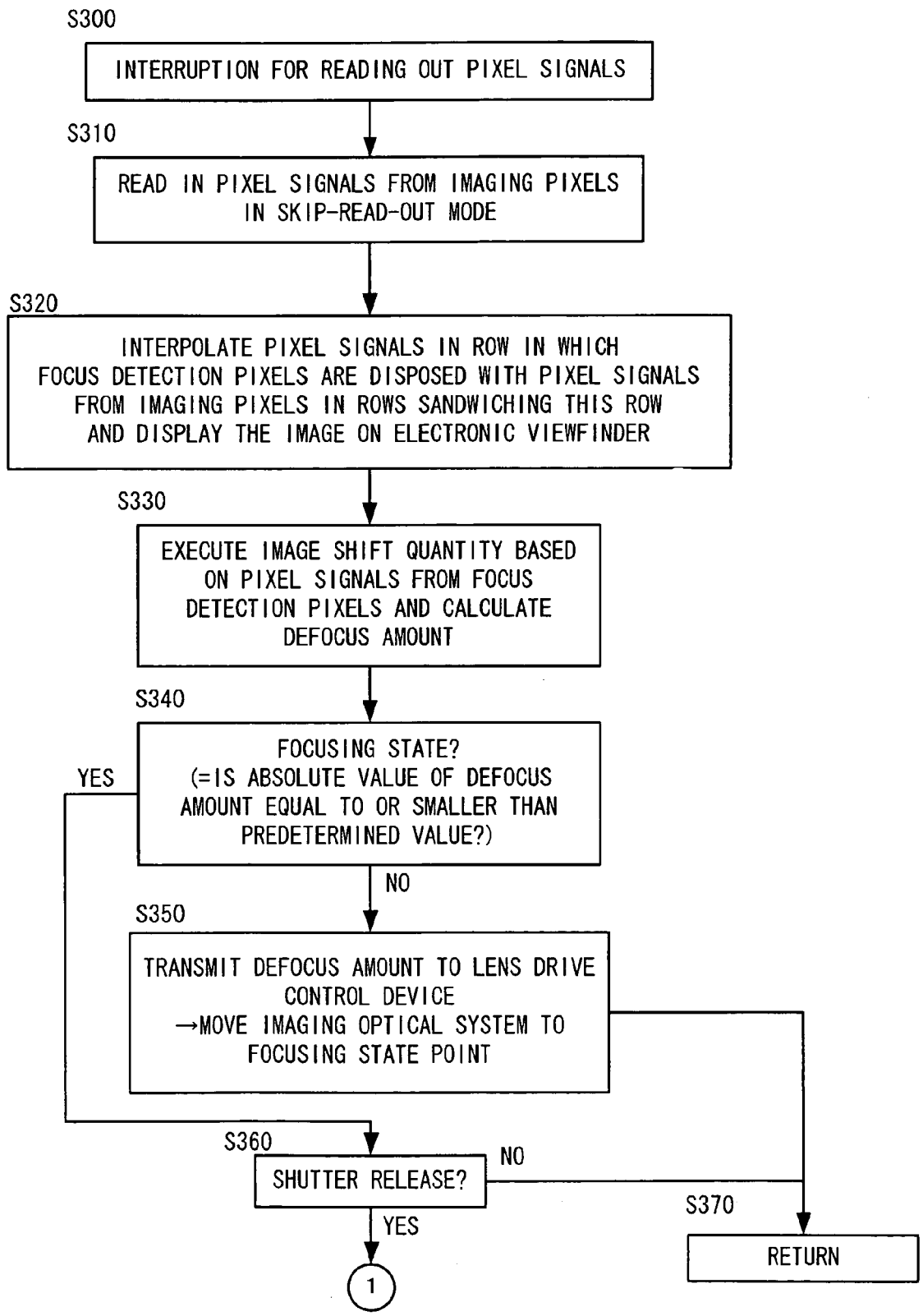
FIG. 16 is a flowchart illustrating a pixel data read-out subroutine.

FIG. 16 is a flowchart illustrating pixel signal read-out interruption processing. When the pixel signal read-out interruption occurs in the step S220 in FIG. 15, the processing for reading out pixel signals is started by the body drive control device 214. When outputting pixel signals, the image sensor 212 issues a notice of pixel signal read-out interruption to the body drive control device 214 immediately before it outputs the first pixel signal. When the image sensor 212 executes a periodical operation in the skip-read-out mode, the interruption occurs periodically. The body drive control device 214 starts the processing at a step S300.

The pixel signal output from the image sensor 212 is read in at a step S310. Subsequently, in a step S320, the body drive control device 214 interpolates the pixel signals of the imaging pixels 310 in the row in which the focus detection pixels 313 and 314 are disposed (i.e., in the second row in the example shown in FIG. 10) with the pixel signals from the imaging pixels 310 selected with skipping in the rows sandwiching the above-mentioned row (i.e., in the first and the third rows in the example shown in FIG. 10). That is, since the pixel signals of the imaging pixels 310 are not read out in the row in which the focus detection pixels 313 and 314 are disposed, the pixel signals of the imaging pixels 310 in that row are interpolated with the pixel signals of the surrounding imaging pixels 310. Then, an image is generated based on the pixel signals from the imaging pixels 310 selected with skipping and the pixel signals after interpolation (interpolated pixel signals) and the generated image is displayed on the liquid crystal display device 216 (i.e., live view display). In the example shown in FIG. 10, the interpolated pixel signals at the pixel points in the first, third, fifth, and seventh columns in the second row are obtained by averaging the pixel signals of the imaging pixels 310 at the first, third, fifth, and seventh columns in the first row and the pixel signals of the imaging pixels 310 the first, third, fifth, and seventh columns in the third row.

In a step S330, calculation processing for detecting image shift (hereafter, "image shift detection calculation processing") (or "correlation arithmetic processing") to be detailed later is executed based on a signal string of a pair of focus detection pixels in the focus detection area 101 (FIG. 2) (i.e., a string of pixel signals of the focus detection pixels 313 and 314 indicated by white circles in the example shown in FIG. 10) to calculate an image shift quantity in the focus detection area 10. Further, the image shift quantity is converted into a defocus amount. In a step 340, a decision is made as to whether or not the current condition is a "close-to-focusing state", i.e., whether or not the absolute value of the defocus amount that has been calculated is equal to or less than a predetermined value. If it is decided that the current condition is not the close-to-focusing state, the operation proceeds to a step 350 to transmit the calculated defocus amount to the lens drive control device 206 and update the drive of the focusing lens 210 at the exchangeable lens 202 to the focusing point and the operation proceeds to a step S370. Note that the operation also branches to this step if the focus detection is impossible to perform and a scan drive instruction is transmitted to the lens drive control device 206. In response, the lens drive control device 206 drives the focusing lens 210 at the exchangeable lens 202 to scan between the infinity point and the close-up point. Subsequently, the operation proceeds to the step S370.

If, on the other hand, it is decided that the current condition is the close-to-focusing state, the operation proceeds to a step 360 to make a decision as to whether or not a shutter release has occurred in response to an operation of the shutter release button (not shown). If it is decided that a shutter release has not yet occurred, the operation proceeds to the step 370. Then, the operation returns from the pixel signal read-out interruption processing to the step S220 for the image sensor skip-read-out subroutine shown in FIG. 15 to wait on standby for the occurrence of pixel signal read-out interruption in a next cycle. Note that the processing time for the pixel signal read-out interruption processing in the steps S300 to S360 is shorter than the cycle in which the pixel signal read-out interruption occurs. If it is decided that the shutter release operation has occurred, the release sequence operation shown in FIG. 17 is executed.

FIG. 17 is a flowchart illustrating an operation of release sequence (hereafter, "release sequence operation"). A whole-pixels-read-out mode is set to the image sensor in a step S460 and imaging operation is performed in one-shot. Occurrence of pixel signal read-out interruption is waited on standby in a step S470. Subsequently, if a notice of occurrence of pixel signal read-out interruption is issued in a step S480, the pixel signals output from the image sensor 212 are read in. In a step S490, the pixel signals from the focus detection pixels 313 and 314 are interpolated with the pixel signals from the imaging pixels 310 surrounding the focus detection pixels 313 and 314. In a step S500, the pixel signals from the imaging pixels 310 and the above-mentioned interpolated pixel signals are stored as image data in the memory card 219. In a step S510, the operation jumps to the image sensor skip-read-out mode subroutine shown in FIG. 15, in which the image sensor 212 is set into the skip-read-out mode again to start a repeated imaging operation in the skip-read-out mode.

Next, the image shift detection arithmetic processing (correlation calculation processing) executed in the step S330 in FIG. 16 is explained below in detail. Since an imbalance may have occurred with regard to the quantities of light in the pair of images detected via the focus detection pixels due to vignetting of a focus detection light flux through the pupil for focus detection by the aperture opening of the lens, a specific type of correlation calculation which assures a satisfactory level of image shift detection accuracy even in the event of an imbalance in the light quantities needs to be executed. The correlation calculation expressed in expression (1) is executed on a pair of data strings ($A1_1 \sim A1_M$, $A2_1 \sim A2_M$; M indicates the number of sets of data) read out from the focus detection pixel row so as to calculate correlation quantity C(k). A pair of data strings $A1_1 \sim A1_M$ and $A2_1 \sim A2_M$ (where M is a data number) is subjected to the correlation calculation represented by the following expression (1) to calculate a correlation amount C(k).

$$C(k) = \Sigma |A1_n \cdot A2_{n+1+k} - A2_{n+k} \cdot A1_{n+1}| \qquad (1)$$

In the expression (1) above, the Σ operation (i.e., summation) is cumulatively executed with regard to n and the range assumed for n is limited to the range over which the data $A1_n$, $A1_{n+1}$, $A2_{n+k}$ and $A2_{n+1+k}$ exist in correspondence to the image shift quantity k. In addition, the image shift quantity k is an integer, which represents a relative shift quantity assuming a value that matches the data interval with which the data in the data strings are sampled as a unit.

Figure 18A:
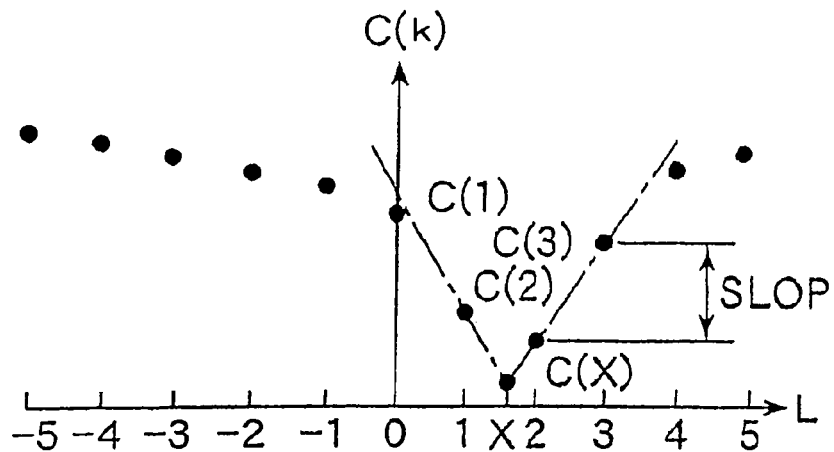
FIGS. 18A to 18C each are a diagram illustrating the method for judging results of image shift detection calculation processing (correlation calculation processing)

The results of the arithmetic operation executed as expressed in expression (1) may indicate as shown in FIG. 18A that the correlation quantity C(k) assumes the minimum value at the shift quantity at which the pair of sets of data achieve a high level of correlation (i.e., when k=kj=2 in FIG. 18A). Note that the smaller the value, the higher the correlation level. The shift quantity x, which gives the minimum value C(x) in the continuous correlation quantity graph, is determined by adopting a three-point interpolation method expressed in (2)~(5) below.

$$x = k_j + D/\text{SLOP} \qquad (2)$$

$$C(x) = C(k_j) - |D| \qquad (3)$$

$$D = \{C(k_j-1) - C(k_j+1)\}/2 \qquad (4)$$

$$\text{SLOP} = \text{MAX}\{C(k_j+1) - C(k_j), C(k_j-1) - C(k_j)\} \qquad (5)$$

Figure 18B:
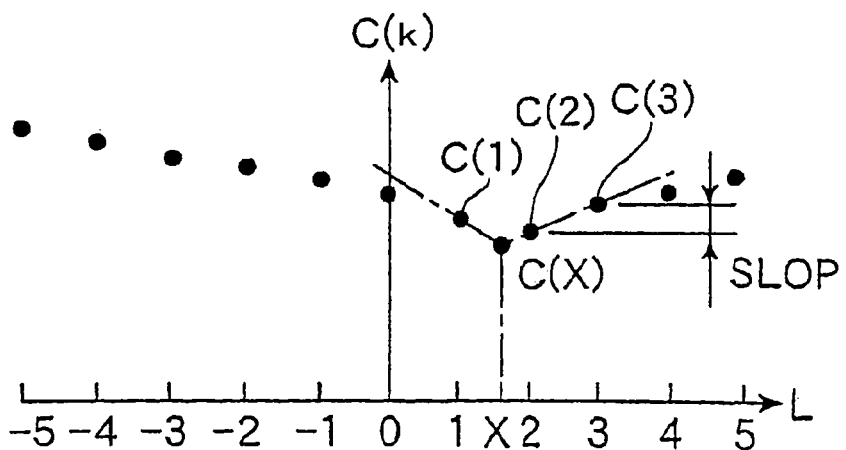
Figure 18C:
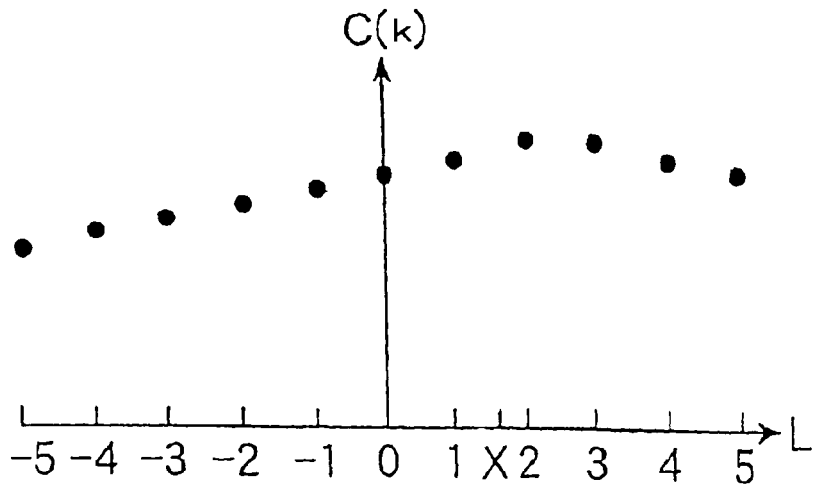

The judgment as to whether or not the shift quantity x calculated as expressed in expression (2) is reliable is made as follows. As shown in FIG. 18B, the interpolated minimum value C(x) of the correlation quantity increases when the level of correlation between the pair of sets of data is low. Accordingly, if C(x) is equal to or greater than a predetermined threshold value, the shift quantity is judged to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x is canceled. As a further alternative, if SLOP indicating the value in proportion to the contrast is equal to or less than a predetermined value, the subject should be judged to be a low-contrast subject and, accordingly, the reliability of the calculated shift quantity should be judged to be low and accordingly, the calculated shift quantity x is canceled. If the level of correlation between the pair of sets of data is low and the correlation quantity C(k) does not dip at all over the shift range $k_{min}$ to $k_{max}$, as shown in FIG. 18C, the minimum value C(x) cannot be determined. In this case, it is decided that the focus detection is impossible to execute.

Note that the correlation calculation expression is not limited to the above-mentioned expression (1). Any correlation calculation expression may be used as far as it is of the type that can assure image shift detection accuracy even when there is imbalance in light quantity between the pair of images detected via the focus detection pixels.

If the shift quantity x having been calculated is judged to be reliable, the shift quantity is then converted to an image shift amount shft as expressed in (6) below.

$$\text{shft} = PY \times X \qquad (6)$$

In the expression (6), PY represents a detection pitch. The shift amount shft calculated according to the expression (6) is multiplied by a predetermined conversion coefficient k and is thus converted to a defocus amount def as expressed in expression (7) below.

$$\text{def} = k \cdot \text{shift} \qquad (7)$$

Other Embodiments

According to the above-mentioned embodiment, the two types of focus detection pixels 313 and 314 are disposed alternately along a horizontal row corresponding to the center of the photographic field of the image sensor. When pixel signals for one field (one frame) are to be read out in the skip-read-out mode, the pixel signals from the imaging pixels are read out with skipping along the horizontal direction at predetermined pixel intervals in the row consisting of the imaging pixels. On the other hand, the pixel signals from the focus detection pixels exclusively are continuously read out along the horizontal direction without skipping in the central row in which the focus detection pixels are disposed. As a result, this makes it possible to execute both pixel signal read-out for live view display and pixel signal read-out for focus detection simultaneously and at high speed.

In the above-mentioned embodiment, the example has been presented, in which the imaging pixels are selected with skipping, i.e., every another imaging pixel is skipped upon selection and pixel signals are read out from the selected imaging pixels while the focus detection pixels are continuously read out without skipping. However, the present invention is not limited to the above-mentioned read-out method. For example, the body drive control unit 214 may be configured to execute the read-out operation such that image pixels are selected with skipping at intervals of four pixels (i.e., one pixel is selected out of five pixels) and pixel signals are read out therefrom. On the other hand, the focus detection pixels are selected with skipping at intervals of two pixels (i.e., one pixel is selected out of three pixels) and pixel signals are read out therefrom. It should be noted, however, that skip-read-out needs to be performed at intervals of N pixels (where N is an even integer) in the row in which a group of the focus detection pixel is disposed so that pixel signals from two types of focus detection pixels can be alternately read out even in the skip-read-out since two types of focus detection pixels are alternately disposed in the focus detection pixel row.

Reading out pixel signals from the focus detection pixels with skipping results in a decrease in the accuracy of detection of image shifts. However, the skip-read-out is suitable for a case in which more importance is put on focus detection response than on focus detection accuracy since the number of pixel signals to be read out from the focus detection pixels is decreased. In such a case, the body drive control device 214 may be constructed as follows. Signals are once read out from the focus detection pixels continuously before image capturing is executed when a release operation has been performed and highly accurate focus detection is executed based on the focus detection signals. At the same time, strict focus adjustment is executed based on the result of the focus detection and then an imaging operation is executed.

Further, in the above-mentioned embodiment, when pixel signals are read out with skipping, the pixel signals from the imaging pixels are read out with skipping at predetermined pixel intervals in the row in which only the imaging pixels are disposed so as to reduce the number of pixel signals read out in a unit row as compared with the case in which pixel signals are read out in the whole pixels read-out mode. However, the pixel signals are continuously read out only from the focus detection pixels along the horizontal direction without skipping in the central row in which the focus detection pixels are disposed. For this reason, the number of read out signals per row in the central row in which the focus detection pixels are disposed is greater than the number of read out signals per row in the row in which only the imaging pixels are disposed in the skip-read-out mode when the number of focus detection pixels increases. As a result, the number of pixel signals may vary row by row. This is inconvenient in controlling read-out and in processing of signals.

Accordingly, the following measures may be taken. For example, the number of the focus detection pixels is made equal to the number of read out pixel signals per row in which only the imaging pixels are disposed in the skip-read-out-mode, or the former number is made less than the latter number and pixel signals of imaging pixels disposed on both the right and left sides of the focus detection pixels in the same row are read out in order to fill the deficit. Alternatively, when the skip-read-out mode is set, the total number of pixels from which pixel signals are to be read out in the row in which the focus detection pixels are included may be restricted so as to be equal to or less than the total number of pixels from which pixel signals are to be read out in the row in which the focus detection pixels are not included.

In the above-mentioned embodiment, there has been presented the example in which the pixel signals are continuously read out only from the focus detection pixels along the horizontal direction in the central row in which the focus detection pixels are disposed without skipping. However, the horizontal scanning circuit (see FIG. 10) may be adjusted to generate control signals in such a pattern that pixel signals are continuously read out from the focus detection pixels along the horizontal direction without skipping in the central row in which the focus detection pixels are disposed while in the same row, pixel signals are read out from the imaging pixels disposed on both the right and left sides of the focus detection pixels with skipping at predetermined intervals in the same manner as that in the row in which only the imaging pixels are disposed. As a result, it is only necessary upon live view display to interpolate pixel signals from those pixels at the portion of the row in which focus detection pixels are disposed that corresponds to the focus detection pixels.

The horizontal scanning circuit may also be adjusted as follows. That is, pixel signals are read out from imaging pixels and focus detection pixels in the row in which the focus detection pixels are disposed with skipping at predetermined pixel intervals (every N pixels; N: an even integer) and the predetermined pixel interval is made equal to the pixel intervals at which pixel signals are read out with skipping from imaging pixels in the row in which only the imaging pixels are disposed.

Figure 19:
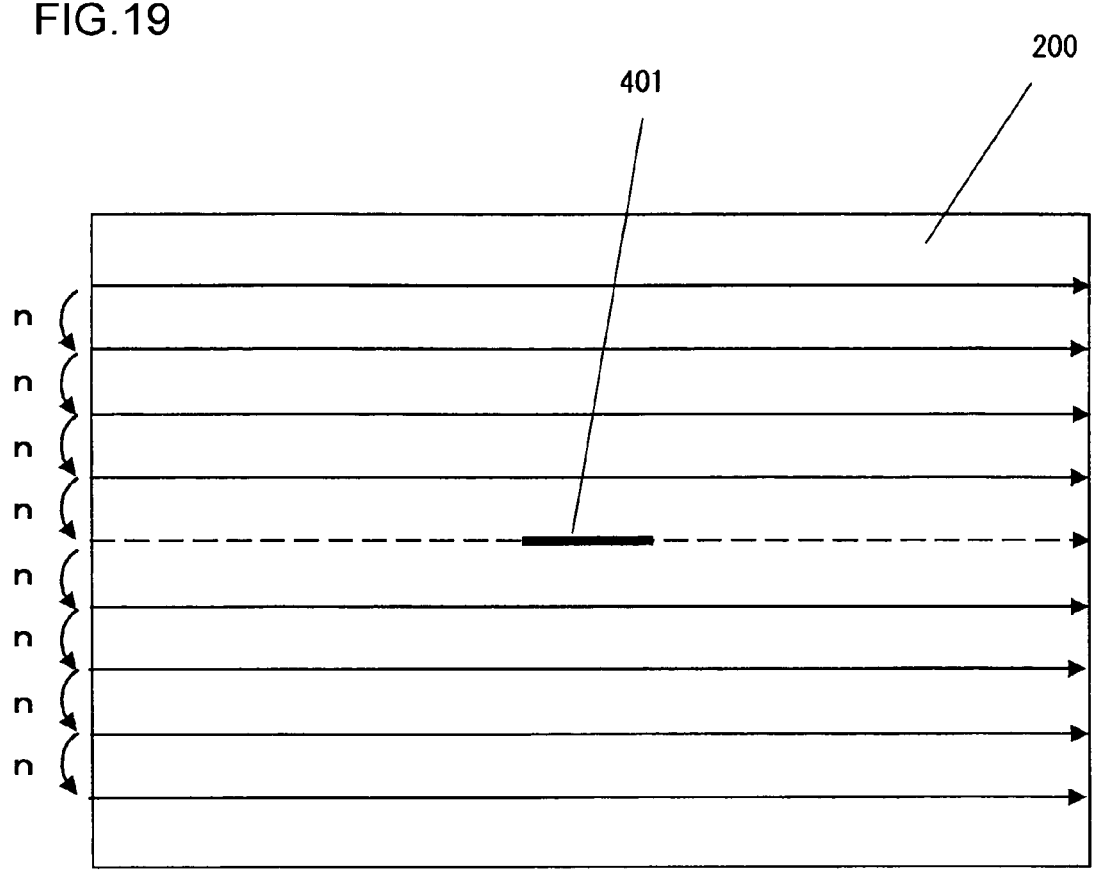
FIG. 19 is a diagram illustrating a line skipping read-out operation along the vertical direction.

In the above-mentioned embodiment, while no rows are skipped along the vertical direction (corresponding to the direction of top and bottom in the photographic field), there may be performed row skipping along the vertical direction such that pixel signals are read out from only one row for every n rows along the vertical direction as shown in FIG. 19. FIG. 19 illustrates the operation of read-out with skipping rows along the vertical direction. Imaging pixels and focus detection pixels are two-dimensionally disposed on a light-receiving surface 200 of the image sensor. Arrows along the horizontal direction (corresponding to the direction of right and left on the photographic field) indicate read-out of pixels for one row from respective rows. A focus detection pixel sequence 401 is disposed in a row indicated by a broken line. A portion of pixel signals read out from the focus detection pixel sequence contains pixel signals from the focus detection pixel sequence 401.

Figure 20:
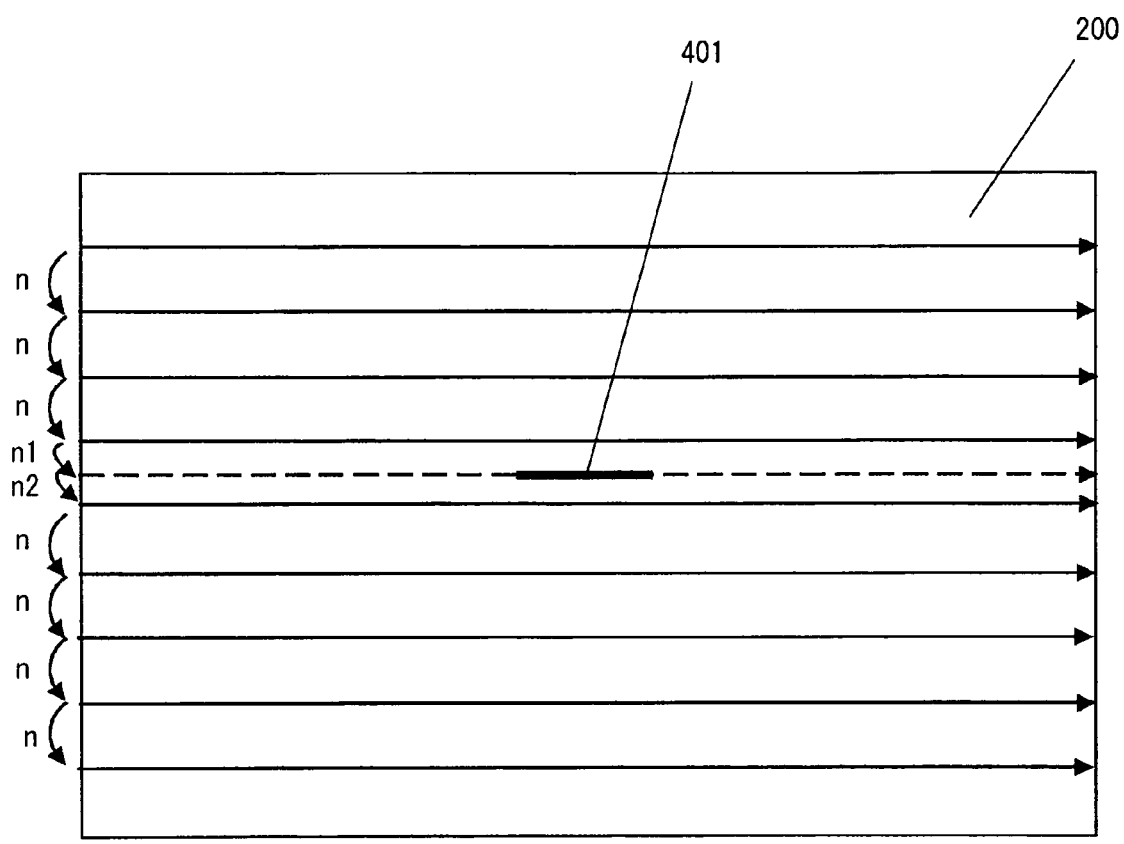
FIG. 20 is a diagram illustrating a line skipping read-out operation.

In the example shown in FIG. 19, the row in which focus detection pixels are disposed as indicated by the broken line is included in those rows to be read out with skipping rows at the predetermined intervals. In such a case, interpolation of pixels has to be performed upon live view display. Thus, as shown in FIG. 20, the row in which the focus detection pixels are disposed as indicated by the broken line is positioned between rows from which pixels signals are to be read-out at the predetermined intervals. In the figure, the relationship n1+n2=n is established. The vertical scanning circuit generates control signals so that one row for every n rows is selected when performing skipping rows by scanning along the vertical direction. However, the vertical scanning circuit generates a special control signal exceptionally for the row in which the focus detection pixels are disposed as indicated by the broken line in order to select that row and enable the pixel signals to be readout from the focus detection pixels. This makes it unnecessary to interpolate pixel signals from the pixels upon live view display.

Figure 21:
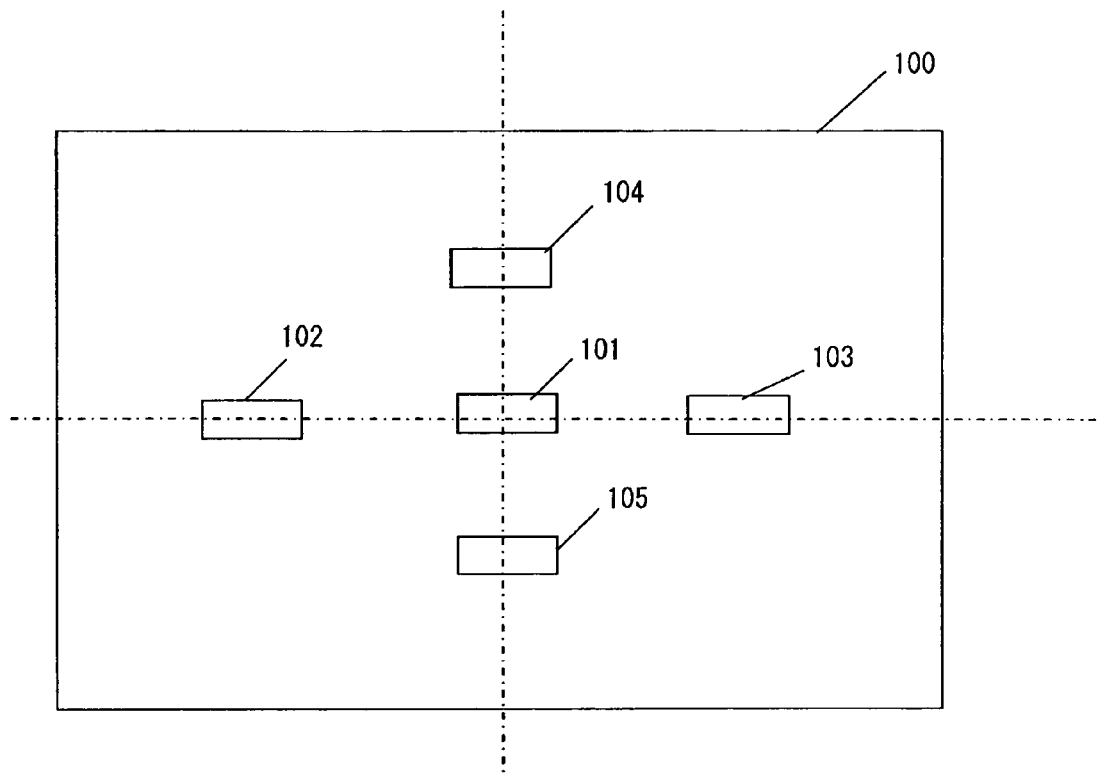
FIG. 21 is a plot plan of the focus detection area of the image sensor in which the focus detection area is disposed in a portion other than the center of the photographic field.
Figure 22:
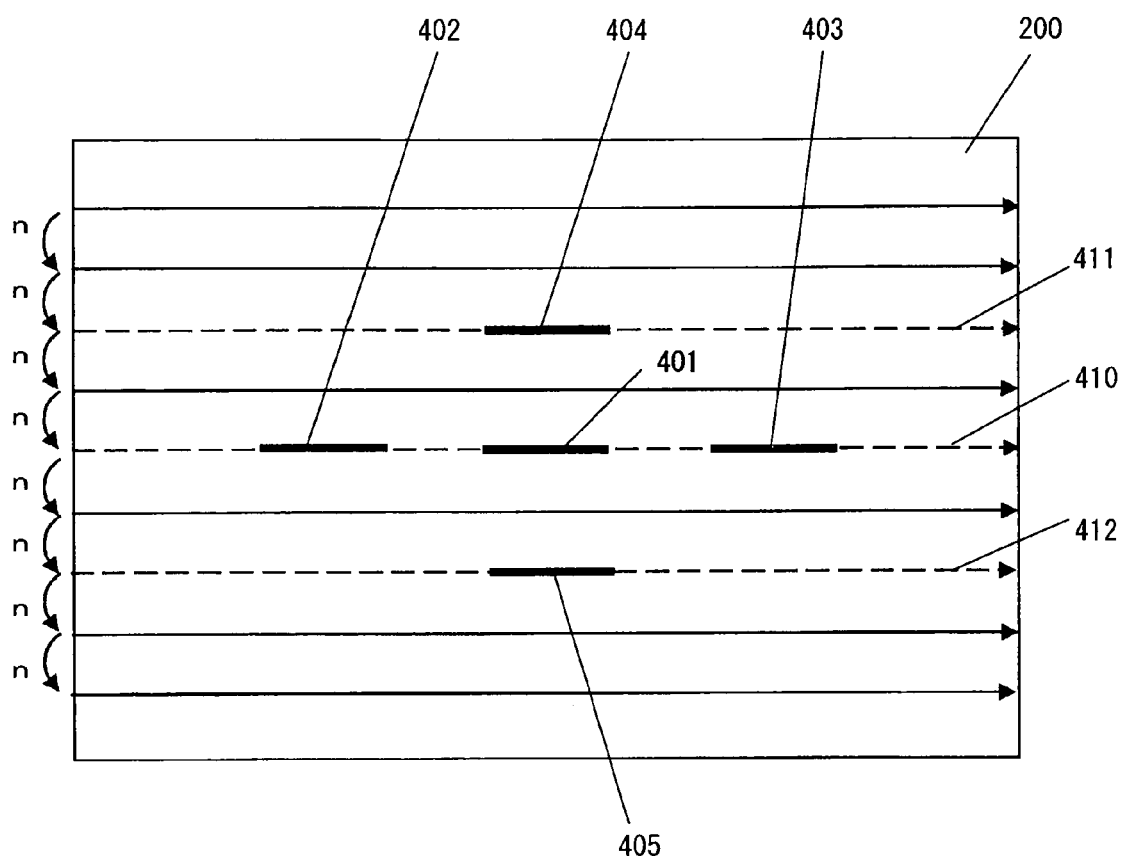
FIG. 22 is a diagram illustrating the line-skipping read-out operation along the vertical direction of the image sensor shown in FIG. 21.

The disposition of the focus detection area in the image sensor is not limited to that shown in FIG. 2. Instead, the focus detection areas 102 to 105 may be disposed in places other than the center of the photographic field 100 as shown in FIG. 21. In such a case, as shown in FIG. 22, pixel signals are continuously read out along the horizontal direction from focus detection pixel sequences 401, 402, and 403 that correspond to the focus detection areas 101, 102, and 103, respectively, in a read-out line 410 along the horizontal direction to be read out with skipping rows along the vertical line among the focus detection pixel sequences disposed in the central, left, and right parts, respectively, of the photographic field 100. Further, pixel signals are continuously read out from a focus detection pixel sequence 404 that corresponds to the focus detection area 104 along the horizontal direction in horizontal read-out line 411 to be read out with skipping rows along the vertical line among the focus detection pixel sequences disposed in the upper part of the photographic field 100. In addition, pixel signals are continuously read out from a focus detection pixel sequence 405 that corresponds to the focus detection area 105 along the horizontal direction in a horizontal read-out line 412 to be read out with skipping rows along the vertical line among the focus detection pixel sequences disposed in the lower part of the photographic field 100.

Figure 23:
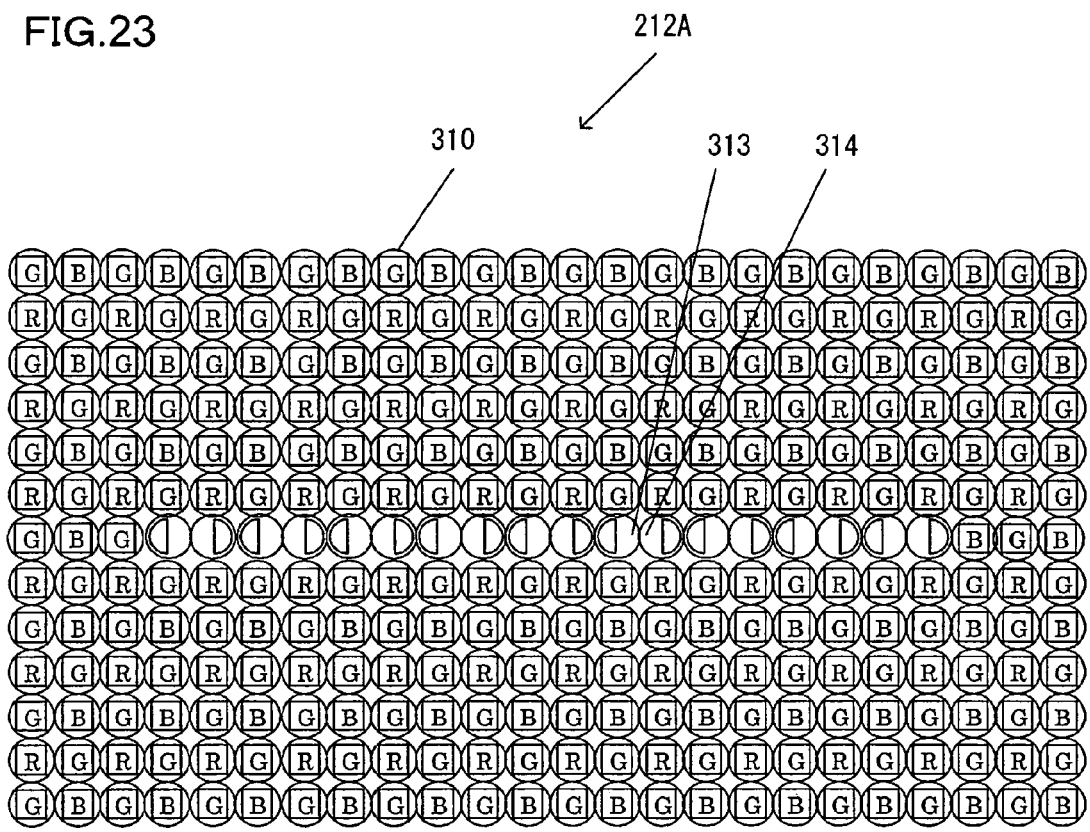
FIG. 23 is a front view showing the construction of the image sensor according to a modification.
Figure 24:
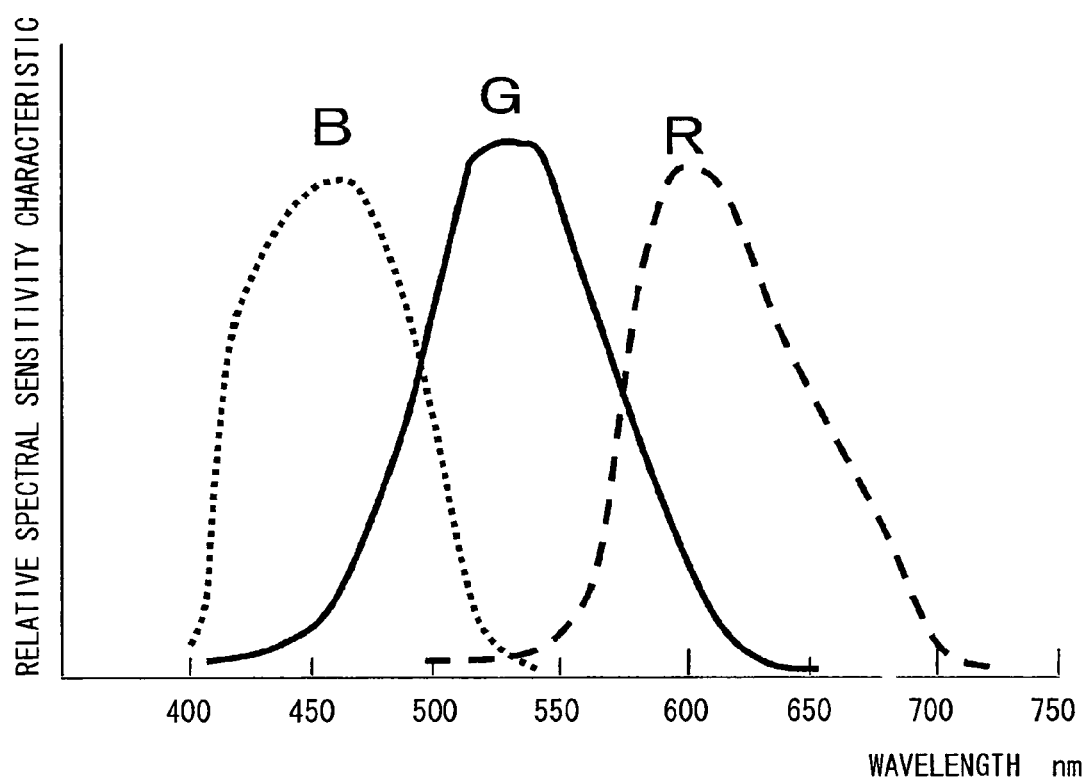
FIG. 24 is a diagram illustrating the spectral sensitivity characteristics of imaging pixels with color filters.

FIG. 23 is a front view showing details of the construction of the image sensor 212A according to a modification, with vicinity of the focus detection area being shown enlarged. The image sensor 212A is constituted with the imaging pixels 310 and the focus detection pixels 313 and 314. The imaging pixels 310 are arranged two-dimensionally along the horizontal and vertical directions to form a square lattice array. The imaging pixels 310 consist of three types of pixels provided with color filters (red, green, and blue) having spectral sensitivity characteristics shown in FIG. 24, i.e., red pixels (R), green pixels (G), and blue pixels (B), respectively. The three types of pixels are disposed in a Bayer array. On the other hand, the focus detection pixels 313 and 314 are disposed alternately along the horizontal direction in the rows that would otherwise be occupied by the blue pixels and the green pixels in the imaging pixels 310.

It is preferred that in such imaging pixels 310, even when pixel signals are read out with skipping both along the horizontal direction and along the vertical direction, the pixel signals read out from the imaging pixels 310 with skipping are arranged in the order of a Bayer array. That is, the predetermined skip interval along the horizontal direction and the predetermined skip interval along the vertical direction are determined as follows. That is, pixel signals are read out from pixels in the order of a red pixel, a green pixel, a red pixel, a green pixel, ..., and so on, or in the order of a green pixel, a blue pixel, a green pixel, a blue pixel, ..., and so on along the horizontal direction. On the other hand, the pixel signals are read out from rows in the order of a row consisting of red pixels and green pixels, a row consisting of green pixels and blue pixels, a row consisting of red pixels and green pixels, a row consisting of green pixels and blue pixels, ..., and so on. In other words, pixel signals are read out from the imaging pixels 310 with skipping every m pixels (where m is an even integer other than 0) along the horizontal direction while pixel signals are read out from the imaging pixels 310 with skipping every M rows (where M is an even integer other than 0) along the vertical direction.

The example of the imaging sensor 212A shown in FIG. 23 includes the imaging pixels 310 provided with color filters in a Bayer array. However, the configuration and disposition of the color filters is not limited to this example. For example, the disposition of the complementary filters (green: G, yellow: Ye, magenta: Mg, cyan: Cy) may be adopted. In addition, the example of the imaging sensor 212A shown in FIG. 23 is provided with no color filters in the focus detection pixels 313 and 314. However, the present invention is also applicable to the case where the focus detection pixels 313 and 314 each are provided with one color filter that has the same color as the color of one of the color filters of the image sensor 310, for example, a green filter.

FIG. 5 shows the examples of the focus detection pixels 313 and 314 with photoelectric conversion units 13 and 14 each having a shape of a half circle. However, the shape of the photoelectric conversion units 13 and 14 is not limited to this but may assume other shapes. For example, the shape of the photoelectric conversion units of the focus detection pixels may be elliptical, rectangular or polygonal. In addition, FIG. 3 shows the example of the image sensor 212, in which the imaging pixels and the focus detection pixels are disposed in a dense square lattice array. However, they may be disposed in a dense hexagonal lattice array.

The imaging apparatus according to the present invention may be embodied as an apparatus other than a digital still camera or a film still camera mounted with an exchangeable lens. The present invention may also be adopted in a digital still camera or a film still camera with an integrated lens or video camera. It may also be adopted in a compact camera module built into a portable telephone or the like, a surveillance camera, a visual recognition device for robots, or the like as well. The present invention may be further adopted in a focus detection device installed in a device other than a camera, a range-finding device or a stereo range-finding device.

Note that when a focus detection pixel disposition consisting of a plurality of focus detection pixels extends over a plurality of rows (as in, for example, the case where the focus detection pixel disposition is arranged along the vertical direction or an oblique direction in FIG. 3), the present invention can be achieved by disposing the focus detection pixels at points other than those that would otherwise be occupied by the imaging pixels which should be skipped upon reading out outputs therefrom among the dispositions of the imaging pixels.

The above-described embodiments are examples and various modifications can be made without departing from the scope of the invention.

What is claimed is:
1. An image sensor comprising:
a plurality of imaging pixels disposed two-dimensionally in rows and columns for receiving light from a subject via an optical system to capture an image;
a plurality of first focus detection pixels each receiving one of a pair of light fluxes for focus detection via the optical system and a plurality of second focus detection pixels each receiving the other of the pair of light fluxes for focus detection via the optical system, the plurality of first focus detection pixels and the plurality of second focus detection pixels being disposed, in place of the imaging pixel, in a portion of a row in which the imaging pixels are to be disposed;
a row selection circuit that selects in turn a row from which pixel signals are read out among the plurality of imaging pixels and the plurality of first and second focus detection pixels being two-dimensionally disposed;
a column selection circuit that selects in turn a column from which pixel signals are read out among the plurality of imaging pixels and the plurality of first and second focus detection pixels being two-dimensionally disposed;
an output circuit that outputs pixel signals from the pixels selected by the column selection circuit, out of the pixels disposed in the rows selected by the row selection circuit; and
a skip-read-out mode in which pixel signals are read out from the pixels with skipping and a whole-pixels-read-out mode in which pixel signals are read out from all the pixels, wherein
the column selection circuit selects a column according to whether or not the row selected by the row selection circuit includes the first focus detection pixels and the second focus detection pixels;
the column selection circuit selects a column from which pixel signals are to be read out in the rows selected by the row selection circuit at a predetermined interval when the skip-read-out mode is set; and
the predetermined interval for the row that includes the first and the second focus detection pixels is set shorter than the predetermined pixel interval for the row that does not include the first and the second focus detection pixels.

2. An image sensor comprising:
a plurality of imaging pixels disposed two-dimensionally in rows and columns for receiving light from a subject via an optical system to capture an image;
a plurality of first focus detection pixels each receiving one of a pair of light fluxes for focus detection via the optical system and a plurality of second focus detection pixels each receiving the other of the pair of light fluxes for focus detection via the optical system, the plurality of first focus detection pixels and the plurality of second focus detection pixels being disposed, in place of the imaging pixel, in a portion of a row in which the imaging pixels are to be disposed;
a row selection circuit that selects in turn a row from which pixel signals are read out among the plurality of imaging pixels and the plurality of first and second focus detection pixels being two-dimensionally disposed;
a column selection circuit that selects in turn a column from which pixel signals are read out among the plurality of imaging pixels and the plurality of first and second focus detection pixels being two-dimensionally disposed;
an output circuit that outputs pixel signals from the pixels selected by the column selection circuit, out of the pixels disposed in the rows selected by the row selection circuit; and a skip-read-out mode in which pixel signals are read out from the pixels with skipping and a whole-pixels-read-out mode in which pixel signals are read out from all the pixels, wherein the column selection circuit selects a column according to whether or not the row selected by the row selection circuit includes the first focus detection pixels and the second focus detection pixels; and when the skip-read-out mode is set, and if the row selected by the row selection circuit does not include the first and the second focus detection pixels, the column selection circuit selects a column from which pixel signals are to be read out at a predetermined interval such that the imaging pixels disposed in the row are evenly selected, or if the row selected by the row selection circuit includes the first and the second focus detection pixels, the column selection circuit selects only the first and the second focus detection pixels or a portion of pixels included in the first and the second focus detection pixels.

3. An image sensor comprising:

a plurality of imaging pixels disposed two-dimensionally in rows and columns for receiving light from a subject via an optional system to capture an image;

a plurality of first focus detection pixels each receiving one of a pair of light fluxes for focus detection via the optical system and a plurality of second focus detection pixels each receiving the other of the pair of light fluxes for focus detection via the optical system, the plurality of first focus detection pixels and the plurality of second focus detection pixels being disposed, in place of the imaging pixel, in a portion of a row in which the imaging pixels are to be disposed;

a row selection circuit that selects in turn a row from which pixel signals are read out among the plurality of imaging pixels and the plurality of first and second focus detection pixels being two-dimensionally disposed;

a column selection circuit that selects in turn a column from which pixel signals are read out among the plurality of imaging pixels and the plurality of first and second focus detection pixels being two-dimensionally disposed;

an output circuit that outputs pixel signals from the pixels selected by the column selection circuit, out of the pixels disposed in the rows selected by the row selection circuit; and a skip-read-out mode in which pixel signals are read out from the pixels with skipping and a whole-pixels-read-out mode in which pixel signals are read out from all the pixels, wherein the column selection circuit selects a column according to whether or not the row selected by the row selection circuit includes the first focus detection pixels and the second focus detection pixels; and when the skip-read-out mode is set, the column selection circuit restricts a total number of pixels from which pixel signals are to be read out in the row in which the first and the second focus detection pixels are included so as to be equal to or less than a total number of pixels from which pixel signals are to be read out in the row in which the first and the second focus detection pixels are not included.

4. An image sensor comprising:

a plurality of imaging pixels disposed two-dimensionally in rows and columns for receiving light from a subject via an optical system to capture an image;

a plurality of first focus detection pixels each receiving one of a pair of light fluxes for focus detection via the optical system and a plurality of second focus detection pixels each receiving the other of the pair of light fluxes for focus detection via the optical system, the plurality of first focus detection pixels and the plurality of second focus detection pixels being disposed, in place of the imaging pixel, in a portion of a row in which the imaging pixels are to be disposed;

a row selection circuit that selects in turn a row from which pixel signals are read out among the plurality of imaging pixels and the plurality of first and second focus detection pixels being two-dimensionally disposed;

a column selection circuit that selects in turn a column from which pixel signals are read out among the plurality of imaging pixels and the plurality of first and second focus detection pixels being two-dimensionally disposed;

an output circuit that outputs pixel signals from the pixels selected by the column selection circuit, out of the pixels disposed in the rows selected by the row selection circuit; and a skip-read-out mode in which pixel signals are read out from the pixels with skipping and a whole-pixels-read-out mode in which pixel signals are read out from all the pixels, wherein the column selection circuit selects a column according to whether or not the row selected by the row selection circuit includes the first focus detection pixels and the second focus detection pixels; and when the whole-pixels-read-out mode is set, the column selection circuits selects a column such that pixel signals are read out from all the pixels in the row selected by the row selection circuit.

5. An image sensor according to claim 4, wherein the imaging pixels each are constituted with a plurality of imaging pixels having spectral sensitivity characteristics different from each other.

6. An imaging apparatus comprising:

an image sensor according to claim 4;

a control unit that controls storage of electric charges in the image sensor and read-out of pixel signals from the image sensor;

an image display device that displays an image based on pixel signals output from the imaging pixels in the image sensor; and a focus detector that detects a focus adjustment state of the optical system based on pixel signals output from the first and the second focus detection pixels in the image sensor.

7. An imaging apparatus according to claim 6, wherein when the skip-read-out is set, the control unit two-dimensionally scans the imaging pixels, the first focus detection pixels, and the second focus detection pixels on the image sensor, periodically performs storage of electric charge and read-out of pixel signals, updates the image displayed by the image display device, and updates a result of the focus detection by the focus detector.

8. An imaging apparatus according to claim 6, wherein when the whole-pixels-read-out mode is set, the control unit controls the row selection circuit and the column selection circuit to read out pixel signals from all the pixels on the image sensor.

9. An imaging apparatus according to claim 6, further comprising:

a focus adjustment unit that performs focus adjustment of the optical system based on the focus adjustment state detected by the focus detector.

10. An imaging apparatus according to claim 6, further comprising:
- an interpolation unit that generates pixel signals at points of the first focus detection pixels and the second focus detection pixels, respectively, based on pixel signals of the plurality of imaging pixels disposed around the first focus detection pixels and the second focus detection pixels, wherein
- the image display device displays an image based on the pixel signals output from the imaging pixels and the pixel signals generated by the interpolation unit.

11. An image sensor comprising:
- a plurality of imaging pixels disposed two-dimensionally in rows and columns for receiving light from a subject via an optical system to capture an image;
- a plurality of first focus detection pixels each receiving one of a pair of light fluxes for focus detection via the optical system and a plurality of second focus detection pixels each receiving the other of the pair of light fluxes for focus detection via the optical system, the plurality of first focus detection pixels and the plurality of second focus detection pixels being disposed, in place of the imaging pixel, in a portion of a row in which the imaging pixels are to be disposed;
- a row selection circuit that selects in turn a row from which pixel signals are read out among the plurality of imaging pixels and the plurality of first and second focus detection pixels being two-dimensionally disposed;
- a column selection circuit that selects in turn a column from which pixel signals are read out among the plurality of imaging pixels and the plurality of first and second focus detection pixels being two-dimensionally disposed;
- an output circuit that outputs pixel signals from the pixels selected by the column selection circuit, out of the pixels disposed in the rows selected by the row selection circuit; and
- a skip-read-out mode in which pixel signals are read out from the pixels with skipping and a whole-pixels-read-out mode in which pixel signals are read out from all the pixels, wherein
- the column selection circuit selects a column according to whether or not the row selected by the row selection circuit includes the first focus detection pixels and the second focus detection pixels; and
- when the skip-read-out mode is set, the row selection circuits selects a row from which pixel signals are to be read out at a predetermined interval and selects a row in which the first and the second focus detection pixels are included as the rows from which pixel signals are to be read out.

12. An image sensor comprising:
- a plurality of imaging pixels disposed two-dimensionally in rows and columns for receiving light from a subject via an optical system to capture an image;
- a plurality of first focus detection pixels each receiving one of a pair of light fluxes for focus detection via the optical system and a plurality of second focus detection pixels each receiving the other of the pair of light fluxes for focus detection via the optical system, the plurality of first focus detection pixels and the plurality of second focus detection pixels being disposed, in place of the imaging pixel, in a portion of a row in which the imaging pixels are to be disposed;
- a row selection circuit that selects in turn a row from which pixel signals are read out among the plurality of imaging pixels and the plurality of first and second focus detection pixels being two-dimensionally disposed;
- a column selection circuit that selects in turn a column from which pixel signals are read out among the plurality of imaging pixels and the plurality of first and second focus detection pixels being two-dimensionally disposed; and
- an output circuit that outputs pixel signals from the pixels selected by the column selection circuit, out of the pixels disposed in the rows selected by the row selection circuit, wherein
- the column selection circuit selects a column according to whether or not the row selected by the row selection circuit includes the first focus detection pixels and the second focus detection pixels; and
- the first focus detection pixels each are constituted with a micro-lens and a first photoelectric converting unit disposed on a rear side of the micro-lens and the second focus detection pixels each are constituted with a micro-lens and a second photoelectric converting unit disposed on a rear side of the micro-lens that constitutes the second photoelectric conversion unit, with the second photoelectric converting unit being paired with the first photoelectric converting unit.

* * * * *